US012345158B1

(12) United States Patent
Sollami

(10) Patent No.: US 12,345,158 B1
(45) Date of Patent: Jul. 1, 2025

(54) BIT TIP INSERT

(71) Applicant: The Sollami Company, Herrin, IL (US)

(72) Inventor: Phillip Sollami, Herrin, IL (US)

(73) Assignee: The Sollami Company, Hernin, IL (US)

( * ) Notice: Subject to any disclaimer, the term of this patent is extended or adjusted under 35 U.S.C. 154(b) by 0 days.

(21) Appl. No.: 17/203,244

(22) Filed: Mar. 16, 2021

Related U.S. Application Data

(63) Continuation-in-part of application No. 16/887,466, filed on May 29, 2020.

(60) Provisional application No. 62/864,241, filed on Jun. 20, 2019.

(51) Int. Cl.
*E21C 35/183* (2006.01)
*B28D 1/18* (2006.01)

(52) U.S. Cl.
CPC .......... *E21C 35/1837* (2020.05); *B28D 1/188* (2013.01); *E21C 35/183* (2013.01)

(58) Field of Classification Search
CPC .... E21C 35/1831; E21C 35/18; E21C 35/183; E21C 35/1833; E21C 35/1835; E21C 35/1837; E21B 10/46; E21B 10/485; E21B 10/52; E21B 10/55; E21B 10/56; E21B 10/567; E21B 10/5671; E21B 10/5673; E21B 10/5676; E21B 10/58; B28D 1/186; B28D 1/188; B23B 51/048; B23B 2200/0461; B23B 2200/083; B23B 2226/315; B23B 2240/08; B23B 2265/08
See application file for complete search history.

(56) References Cited

U.S. PATENT DOCUMENTS

| | | | |
|---|---|---|---|
| 220,933 | A | 10/1879 | McGill |
| 2,382,947 | A | 7/1944 | Brozek |
| 2,783,799 | A | 3/1957 | Hart |
| 2,810,567 | A | 10/1957 | Kirkham |
| 3,342,531 | A | 9/1967 | Krekeler |
| 3,342,532 | A | 9/1967 | Krekeler |
| 3,397,012 | A | 8/1968 | Krekeler |
| 3,476,438 | A | 11/1969 | Bower, Jr. |
| 3,519,309 | A | 7/1970 | Engle |
| 3,807,804 | A | 4/1974 | Kniff |
| 3,833,264 | A | 9/1974 | Elders |
| 3,833,265 | A | 9/1974 | Elders |

(Continued)

FOREIGN PATENT DOCUMENTS

| | | | |
|---|---|---|---|
| AU | 2010101347 A4 * | 1/2011 | .......... E21C 35/197 |
| DE | 102004049710 | 4/2006 | |

(Continued)

*Primary Examiner* — Janine M Kreck
(74) *Attorney, Agent, or Firm* — Mercedes V. O'Connor; Rockman Videbeck & O'Connor

(57) ABSTRACT

A rotatable or non-rotatable bit for road milling, mining, and trenching equipment that includes a substantially solid body and a substantially solid, generally cylindrical shank depending from a bottom of the body. The forward portion is machined to include a bore having a bore termination with a flat distal end and an arcuate portion curving into the sidewall of the bore. The bore is adapted to receive a bit tip insert complementary shaped to the bore of the forward portion, the bit tip insert comprising at least three evenly spaced ribs on an outer surface of a base of the bit tip insert.

28 Claims, 14 Drawing Sheets

WEIGHT: 116.65 GRAMS
VOLUME: .480 CU.IN. (242) G/IN³

(56) References Cited

U.S. PATENT DOCUMENTS

| | | | | | |
|---|---|---|---|---|---|
| 3,853,258 | A | | 12/1974 | Louw et al. | |
| 3,865,437 | A | | 2/1975 | Crosby | |
| 3,997,011 | A | | 12/1976 | Staroba | |
| 4,077,734 | A | * | 3/1978 | Kita | B23P 11/00 175/426 |
| 4,084,856 | A | | 4/1978 | Emmerich | |
| 4,109,737 | A | * | 8/1978 | Bovenkerk | E21B 10/5673 407/51 |
| 4,247,150 | A | | 1/1981 | Wrulich et al. | |
| RE30,807 | E | | 12/1981 | Elders | |
| 4,310,939 | A | | 1/1982 | Iijima | |
| 4,334,585 | A | * | 6/1982 | Upton | E21B 10/62 175/393 |
| 4,453,775 | A | | 6/1984 | Clemmow | |
| 4,478,298 | A | | 10/1984 | Hake | |
| 4,489,986 | A | | 12/1984 | Dziak | |
| 4,505,342 | A | * | 3/1985 | Barr | E21B 10/602 175/428 |
| 4,520,997 | A | | 6/1985 | Lorton | |
| 4,525,178 | A | | 6/1985 | Hall | |
| 4,561,698 | A | | 12/1985 | Beebe | |
| 4,570,726 | A | | 2/1986 | Hall | |
| 4,604,106 | A | | 8/1986 | Hall | |
| 4,632,463 | A | | 12/1986 | Sterwerf, Jr. | |
| 4,679,858 | A | * | 7/1987 | Tank | E21C 35/183 299/113 |
| 4,694,918 | A | | 9/1987 | Hall | |
| 4,702,525 | A | | 10/1987 | Sollami | |
| 4,711,144 | A | * | 12/1987 | Barr | B23P 15/28 175/432 |
| 4,763,956 | A | | 8/1988 | Emmerich | |
| 4,811,801 | A | | 3/1989 | Salesky | |
| 4,818,027 | A | | 4/1989 | Simon | |
| 4,821,819 | A | | 4/1989 | Whysong | |
| 4,844,550 | A | | 7/1989 | Beebe | |
| 4,915,455 | A | | 4/1990 | O'Niell | |
| 4,944,559 | A | | 7/1990 | Sionett | |
| 4,981,328 | A | | 1/1991 | Stiffler et al. | |
| 5,067,775 | A | | 11/1991 | D'Angelo | |
| 5,088,797 | A | | 2/1992 | O'Neill | |
| 5,098,167 | A | | 3/1992 | Latham | |
| 5,159,233 | A | | 10/1992 | Sponseller | |
| 5,161,627 | A | | 11/1992 | Burkett | |
| 5,273,343 | A | | 12/1993 | Ojanen | |
| 5,281,260 | A | | 1/1994 | Kumar et al. | |
| 5,287,937 | A | | 2/1994 | Sollami | |
| 5,302,005 | A | | 4/1994 | O'Neill | |
| 5,303,984 | A | | 4/1994 | Ojanen | |
| 5,352,079 | A | | 10/1994 | Croskey | |
| 5,370,448 | A | | 12/1994 | Sterwerf, Jr. | |
| 5,374,111 | A | | 12/1994 | Den Besten | |
| 5,415,462 | A | | 5/1995 | Massa | |
| 5,417,475 | A | | 5/1995 | Graham et al. | |
| 5,458,210 | A | | 10/1995 | Sollami | |
| 5,484,191 | A | | 1/1996 | Sollami | |
| 5,492,188 | A | | 2/1996 | Smith et al. | |
| 5,541,006 | A | | 7/1996 | Conley | |
| 5,551,760 | A | | 9/1996 | Sollami | |
| 5,607,206 | A | | 3/1997 | Siddle | |
| 5,628,549 | A | | 5/1997 | Ritchey | |
| 5,647,641 | A | | 7/1997 | Sulosky et al. | |
| 5,720,528 | A | | 2/1998 | Ritchey | |
| 5,725,283 | A | | 3/1998 | O'Neill | |
| 5,823,632 | A | | 10/1998 | Burkett | |
| 5,924,501 | A | | 7/1999 | Tibbitts | |
| 5,931,542 | A | | 8/1999 | Britzke | |
| 5,934,854 | A | | 8/1999 | Krautkremer et al. | |
| 5,992,405 | A | | 11/1999 | Sollami | |
| D420,013 | S | | 2/2000 | Warren | |
| 6,019,434 | A | | 2/2000 | Emmerich | |
| 6,102,486 | A | | 8/2000 | Briese | |
| 6,176,552 | B1 | | 1/2001 | Topka, Jr. | |
| 6,196,340 | B1 | | 3/2001 | Jensen et al. | |
| 6,199,451 | B1 | | 3/2001 | Sollami | |
| 6,220,376 | B1 | * | 4/2001 | Lundell | E21B 10/56 175/430 |
| 6,250,535 | B1 | | 6/2001 | Sollami | |
| 6,331,035 | B1 | | 12/2001 | Montgomery, Jr. | |
| 6,341,823 | B1 | | 1/2002 | Sollami | |
| 6,357,832 | B1 | | 3/2002 | Sollami | |
| 6,371,567 | B1 | | 4/2002 | Sollami | |
| 6,382,733 | B1 | | 5/2002 | Parrott | |
| 6,428,110 | B1 | | 8/2002 | Ritchey et al. | |
| 6,508,516 | B1 | | 1/2003 | Kammerer | |
| D471,211 | S | | 3/2003 | Sollami | |
| 6,585,326 | B2 | | 7/2003 | Sollami | |
| 6,685,273 | B1 | | 2/2004 | Sollami | |
| 6,692,083 | B2 | | 2/2004 | Latham | |
| D488,170 | S | | 4/2004 | Sollami | |
| 6,733,087 | B2 | | 5/2004 | Hall | |
| 6,739,327 | B2 | | 5/2004 | Sollami | |
| 6,786,557 | B2 | | 9/2004 | Montgomery | |
| 6,824,225 | B2 | | 11/2004 | Stiffler | |
| 6,846,045 | B2 | | 1/2005 | Sollami | |
| 6,854,810 | B2 | | 2/2005 | Montgomery | |
| 6,866,343 | B2 | | 3/2005 | Holl et al. | |
| 6,968,912 | B2 | | 11/2005 | Sollami | |
| 6,994,404 | B1 | | 2/2006 | Sollami | |
| 7,097,258 | B2 | | 8/2006 | Sollami | |
| 7,118,181 | B2 | | 10/2006 | Frear | |
| 7,150,505 | B2 | | 12/2006 | Sollami | |
| 7,195,321 | B1 | | 3/2007 | Sollami | |
| 7,210,744 | B2 | | 5/2007 | Montgomery | |
| 7,229,136 | B2 | | 6/2007 | Sollami | |
| 7,234,782 | B2 | | 6/2007 | Stehney | |
| D554,162 | S | | 10/2007 | Hall | |
| 7,320,505 | B1 | | 1/2008 | Hall | |
| 7,338,135 | B1 | | 3/2008 | Hall | |
| 7,347,292 | B1 | | 3/2008 | Hall | |
| D566,137 | S | | 4/2008 | Hall | |
| 7,353,893 | B1 | | 4/2008 | Hall | |
| 7,384,105 | B2 | | 6/2008 | Hall | |
| 7,396,086 | B1 | | 6/2008 | Hall | |
| 7,401,862 | B2 | | 7/2008 | Holl et al. | |
| 7,401,863 | B1 | | 7/2008 | Hall | |
| 7,410,221 | B2 | | 8/2008 | Hall | |
| 7,413,256 | B2 | | 8/2008 | Hall | |
| 7,413,258 | B2 | | 8/2008 | Hall | |
| 7,419,224 | B2 | | 9/2008 | Hall | |
| 7,445,294 | B2 | | 11/2008 | Hall | |
| D581,952 | S | | 12/2008 | Hall | |
| 7,464,993 | B2 | | 12/2008 | Hall | |
| 7,469,756 | B2 | | 12/2008 | Hall | |
| 7,469,971 | B2 | | 12/2008 | Hall | |
| 7,469,972 | B2 | | 12/2008 | Hall | |
| 7,475,948 | B2 | | 1/2009 | Hall | |
| 7,523,794 | B2 | | 4/2009 | Hall | |
| 7,568,770 | B2 | | 8/2009 | Hall | |
| 7,569,249 | B2 | | 8/2009 | Hall | |
| 7,571,782 | B2 | | 8/2009 | Hall | |
| 7,575,425 | B2 | | 8/2009 | Hall | |
| 7,588,102 | B2 | | 9/2009 | Hall | |
| 7,594,703 | B2 | | 9/2009 | Hall | |
| 7,600,544 | B1 | | 10/2009 | Sollami | |
| 7,600,823 | B2 | | 10/2009 | Hall | |
| 7,628,233 | B1 | | 12/2009 | Hall | |
| 7,635,168 | B2 | | 12/2009 | Hall | |
| 7,637,574 | B2 | | 12/2009 | Hall | |
| 7,648,210 | B2 | | 1/2010 | Hall | |
| 7,665,552 | B2 | | 2/2010 | Hall | |
| 7,669,938 | B2 | | 3/2010 | Hall | |
| 7,681,338 | B2 | | 3/2010 | Hall | |
| 7,712,693 | B2 | | 5/2010 | Hall | |
| 7,717,365 | B2 | | 5/2010 | Hall | |
| 7,722,127 | B2 | | 5/2010 | Hall | |
| 7,789,468 | B2 | | 9/2010 | Sollami | |
| 7,832,808 | B2 | | 11/2010 | Hall | |
| 7,883,155 | B2 | | 2/2011 | Sollami | |
| 7,950,745 | B2 | | 5/2011 | Sollami | |
| 7,963,617 | B2 | | 6/2011 | Hall | |
| 7,992,944 | B2 | | 8/2011 | Hall | |
| 7,992,945 | B2 | | 8/2011 | Hall | |
| 7,997,660 | B2 | | 8/2011 | Monyak et al. | |

(56) References Cited

U.S. PATENT DOCUMENTS

| | | | |
|---|---|---|---|
| 7,997,661 | B2 | 8/2011 | Hall |
| 8,007,049 | B2 | 8/2011 | Fader |
| 8,007,051 | B2 | 8/2011 | Hall |
| 8,029,068 | B2 | 10/2011 | Hall |
| 8,033,615 | B2 | 10/2011 | Hall |
| 8,033,616 | B2 | 10/2011 | Hall |
| 8,038,223 | B2 | 10/2011 | Hall |
| 8,061,784 | B2 | 11/2011 | Hall |
| 8,109,349 | B2 | 2/2012 | Hall |
| 8,118,371 | B2 | 2/2012 | Hall |
| 8,136,887 | B2 | 3/2012 | Hall |
| 8,201,892 | B2 | 6/2012 | Hall |
| 8,215,420 | B2 | 7/2012 | Hall |
| 8,292,372 | B2 | 10/2012 | Hall |
| 8,414,085 | B2 | 4/2013 | Hall |
| 8,449,039 | B2 | 5/2013 | Hall |
| 8,485,609 | B2 | 7/2013 | Hall |
| 8,500,209 | B2 | 8/2013 | Hall |
| 8,540,320 | B2 | 9/2013 | Sollami |
| RE44,690 | E | 1/2014 | Sollami |
| 8,622,482 | B2 | 1/2014 | Sollami |
| 8,622,483 | B2 | 1/2014 | Sollami |
| 8,646,848 | B2 | 2/2014 | Hall |
| 8,728,382 | B2 | 5/2014 | Hall |
| 8,740,314 | B2 | 6/2014 | O'Neill |
| 9,004,610 | B2 | 4/2015 | Erdmann et al. |
| 9,028,008 | B1 | 5/2015 | Bookhamer |
| 9,039,099 | B2 | 5/2015 | Sollami |
| 9,316,061 | B2 | 4/2016 | Hall |
| 9,518,464 | B2 | 12/2016 | Sollami |
| 9,879,531 | B2 | 1/2018 | Sollami |
| 9,909,416 | B1 | 3/2018 | Sollami |
| 9,976,418 | B2 | 5/2018 | Sollami |
| 9,988,903 | B2 | 6/2018 | Sollami |
| 10,072,501 | B2 | 9/2018 | Sollami |
| 10,105,870 | B1 | 10/2018 | Sollami |
| 10,107,097 | B1 | 10/2018 | Sollami |
| 10,107,098 | B2 | 10/2018 | Sollami |
| 10,180,065 | B1 | 1/2019 | Sollami |
| 10,260,342 | B1 | 4/2019 | Sollami |
| 10,323,515 | B1 | 6/2019 | Sollami |
| 10,337,324 | B2 | 7/2019 | Sollami |
| 10,370,966 | B1 | 8/2019 | Sollami |
| 10,385,689 | B1 | 8/2019 | Sollami |
| 10,415,386 | B1 | 9/2019 | Sollami |
| 10,502,056 | B2 | 12/2019 | Sollami |
| 10,648,330 | B1 | 5/2020 | Weaver et al. |
| 10,947,844 | B1 | 3/2021 | Sollami |
| 10,954,785 | B2 | 3/2021 | Sollami |
| 2002/0063467 | A1 | 5/2002 | Taitt |
| 2002/0074850 | A1 | 6/2002 | Montgomery, Jr. |
| 2002/0074851 | A1 | 6/2002 | Montgomery, Jr. |
| 2002/0109395 | A1 | 8/2002 | Sollami |
| 2002/0167216 | A1 | 11/2002 | Sollami |
| 2002/0192025 | A1 | 12/2002 | Johnson |
| 2003/0015907 | A1 | 1/2003 | Sollami |
| 2003/0047985 | A1 | 3/2003 | Stiffler |
| 2003/0052530 | A1 | 3/2003 | Sollami |
| 2003/0122414 | A1 | 7/2003 | Sollami |
| 2003/0209366 | A1 | 11/2003 | McAlvain |
| 2004/0004389 | A1 | 1/2004 | Latham |
| 2004/0026132 | A1 | 2/2004 | Hall et al. |
| 2004/0174065 | A1 | 9/2004 | Sollami |
| 2005/0212345 | A1 | 9/2005 | Sleep et al. |
| 2006/0071538 | A1 | 4/2006 | Sollami |
| 2006/0186724 | A1 | 8/2006 | Stehney |
| 2006/0261663 | A1 | 11/2006 | Sollami |
| 2007/0013224 | A1 | 1/2007 | Stehney |
| 2007/0040442 | A1 | 2/2007 | Weaver |
| 2007/0052279 | A1 | 3/2007 | Sollami |
| 2008/0035386 | A1 | 2/2008 | Hall et al. |
| 2008/0036276 | A1 | 2/2008 | Hall et al. |
| 2008/0036283 | A1 | 2/2008 | Hall et al. |
| 2008/0042484 | A1 | 2/2008 | Majagi et al. |
| 2008/0100124 | A1 | 5/2008 | Hall et al. |
| 2008/0145686 | A1 | 6/2008 | Mirchandani et al. |
| 2008/0164747 | A1 | 7/2008 | Weaver et al. |
| 2008/0284234 | A1 | 11/2008 | Hall et al. |
| 2009/0020339 | A1* | 1/2009 | Sherwood, Jr. ....... E21B 10/633 175/426 |
| 2009/0146491 | A1 | 6/2009 | Fader et al. |
| 2009/0160238 | A1 | 6/2009 | Hall et al. |
| 2009/0184564 | A1 | 7/2009 | Brady |
| 2009/0256413 | A1* | 10/2009 | Majagi .................. B28D 1/188 299/100 |
| 2009/0261646 | A1 | 10/2009 | Ritchie et al. |
| 2010/0045094 | A1 | 2/2010 | Sollami |
| 2010/0206641 | A1 | 8/2010 | Hall et al. |
| 2010/0244545 | A1 | 9/2010 | Hall |
| 2010/0253130 | A1 | 10/2010 | Sollami |
| 2010/0263939 | A1 | 10/2010 | Hall et al. |
| 2010/0320003 | A1 | 12/2010 | Sollami |
| 2010/0320829 | A1 | 12/2010 | Sollami |
| 2011/0006588 | A1 | 1/2011 | Monyak et al. |
| 2011/0089747 | A1 | 4/2011 | Helsel |
| 2011/0175430 | A1 | 7/2011 | Heiderich et al. |
| 2011/0204703 | A1 | 8/2011 | Sollami |
| 2011/0254350 | A1 | 10/2011 | Hall |
| 2011/0314614 | A1 | 12/2011 | Barnhart et al. |
| 2012/0001475 | A1 | 1/2012 | Dubay et al. |
| 2012/0027514 | A1 | 2/2012 | Hall |
| 2012/0056465 | A1 | 3/2012 | Gerer et al. |
| 2012/0068527 | A1 | 3/2012 | Erdmann |
| 2012/0080931 | A1* | 4/2012 | Wang .................... B28D 1/188 299/113 |
| 2012/0104830 | A1 | 5/2012 | Monyak et al. |
| 2012/0181845 | A1 | 7/2012 | Sollami |
| 2012/0242136 | A1 | 9/2012 | Ojanen |
| 2012/0248663 | A1 | 10/2012 | Hall |
| 2012/0261977 | A1 | 10/2012 | Hall |
| 2012/0280559 | A1 | 11/2012 | Watson |
| 2012/0286559 | A1 | 11/2012 | Sollami |
| 2012/0319454 | A1 | 12/2012 | Swope |
| 2013/0169023 | A1 | 7/2013 | Monyak |
| 2013/0181501 | A1 | 7/2013 | Hall et al. |
| 2013/0187438 | A1* | 7/2013 | Hall ..................... E21C 35/183 299/113 |
| 2013/0199693 | A1 | 8/2013 | Tank et al. |
| 2013/0307316 | A1 | 11/2013 | Roetsch et al. |
| 2014/0035346 | A1 | 2/2014 | Fundakowski et al. |
| 2014/0110991 | A1 | 4/2014 | Sollami |
| 2014/0232172 | A1 | 8/2014 | Roth et al. |
| 2014/0262541 | A1 | 9/2014 | Parsana et al. |
| 2014/0326516 | A1 | 11/2014 | Haugvaldstad |
| 2015/0028656 | A1 | 1/2015 | Sollami |
| 2015/0035343 | A1 | 2/2015 | Ojanen |
| 2015/0137579 | A1 | 5/2015 | Lachmann et al. |
| 2015/0198040 | A1 | 7/2015 | Voitic et al. |
| 2015/0211366 | A1 | 7/2015 | Ries et al. |
| 2015/0240634 | A1 | 8/2015 | Sollami |
| 2015/0285074 | A1 | 10/2015 | Sollami |
| 2015/0292325 | A1 | 10/2015 | Sollami |
| 2015/0300166 | A1 | 10/2015 | Ries et al. |
| 2015/0308488 | A1 | 10/2015 | Kahl |
| 2015/0315910 | A1 | 11/2015 | Sollami |
| 2015/0354285 | A1 | 12/2015 | Hall |
| 2016/0039042 | A1 | 2/2016 | Riggs et al. |
| 2016/0102550 | A1 | 4/2016 | Paros et al. |
| 2016/0194956 | A1 | 7/2016 | Sollami |
| 2016/0229084 | A1 | 8/2016 | Lehnert |
| 2016/0237818 | A1 | 8/2016 | Weber et al. |
| 2017/0001292 | A1 | 1/2017 | Harrison |
| 2017/0043452 | A1 | 2/2017 | Daniels et al. |
| 2017/0089198 | A1 | 3/2017 | Sollami |
| 2017/0101867 | A1 | 4/2017 | Hall et al. |
| 2017/0157720 | A1 | 6/2017 | Sato |
| 2017/0342831 | A1 | 11/2017 | Weber et al. |
| 2018/0245467 | A1* | 8/2018 | Kenno ................ E21C 35/1837 |

(56) References Cited

U.S. PATENT DOCUMENTS

| | | | |
|---|---|---|---|
| 2020/0157890 | A1 | 5/2020 | Cuillier De Maindreville et al. |
| 2020/0277854 | A1 | 9/2020 | Bonetti et al. |

FOREIGN PATENT DOCUMENTS

| | | | |
|---|---|---|---|
| DE | 102011079115 | | 1/2013 |
| DE | 202012100353 | | 6/2013 |
| DE | 102015121953 | | 7/2016 |
| DE | 102016118658 | | 3/2017 |
| EP | 3214261 | | 9/2017 |
| GB | 1114156 | | 5/1968 |
| GB | 1218308 | | 1/1971 |
| GB | 2010356 | | 6/1979 |
| GB | 2211875 | B | 2/1992 |
| GB | 2483157 | | 2/2012 |
| GB | 2534370 | | 7/2016 |
| WO | 2008105915 | A2 | 9/2008 |
| WO | 2008105915 | A3 | 9/2008 |
| WO | 2009006612 | | 1/2009 |

* cited by examiner

DETAIL A

DETAIL C

SECTION B-B

DETAIL D

DETAIL F

SECTION E-E

WEIGHT: 116.65 GRAMS
VOLUME: .480 CU.IN. (242) G/IN³

SECTION G-G

SECTION I-I

DETAIL J

DETAIL H

DETAIL K

DETAIL L

SECTION M-M

DETAIL N

SECTION O-O

DETAIL P

DETAIL Q

BIT TIP INSERT

CROSS-REFERENCE TO RELATED APPLICATION(S)

This application claims priority to U.S. Provisional Application No. 62/864,241, filed Jun. 20, 2019, and claims priority to and is a continuation-in-part of U.S. Non-provisional application Ser. No. 16/887,466, filed May 29, 2020, to the extent allowed by law and the contents of which are incorporated herein by reference in their entireties.

TECHNICAL FIELD

This disclosure relates generally to a bit used in mining, trenching, and milling equipment and, more particularly, to such a bit utilizing a rounded bottom bit tip insert comprising at least three axially aligned nearly evenly spaced ribs on a sidewall of the bit.

BACKGROUND

Road mining, trenching, and milling equipment utilizes bits and/or picks traditionally set in a bit assembly. Bit assemblies can include a bit and/or pick retained within a bore in a base block. Bit assemblies can also include a bit and/or pick retained by a bit holder and the bit holder retained within a bore in a bit holder block, hereinafter referred to as a base block. A plurality of the bit assemblies are mounted on an outside surface of a rotatable, cylindrical drum, typically in a herringbone, V-shape, or spiral configuration. A plurality of the bit assemblies can also be mounted on an endless chain and plate configuration or on an outer surface of a continuous chain. The combinations of bit assemblies have been utilized to remove material from the terra firma, such as degrading the surface of the earth, minerals, cement, concrete, macadam or asphalt pavement. Individual bits and/or picks, bit holders, and base blocks may wear down or break over time due to the harsh road and trenching degrading environment. In one embodiment, a bit of the present disclosure includes a rounded bottom bit tip insert mounted and brazed in a recess at a forward end of the bit, increasing the surface area of the braze joint while eliminating the fulcrum effect of prior art bit tip inserts when high sideload forces are applied to the bit tip insert. The bit tip insert, in one embodiment, also includes at least three axially aligned ribs on a sidewall of the bit tip insert, providing axial alignment stability and centralization of the insert to its corresponding seat. The bit tip insert of the present disclosure also allows external forces to be directed toward the center of the insert and also allows external forces to be applied and distributed along a more even and uniform fashion not only during manufacture of the bit tip insert but also during use of the bit tip insert and bit.

SUMMARY

This disclosure relates generally to a bit for mining, trenching, and/or milling equipment. One implementation of the teachings herein is a bit tip insert that includes a base including an outer sidewall, the outer sidewall including at least three axially aligned evenly spaced elongate ribs; and a forward end comprising a tip.

Another implementation of the teachings herein is a bit that includes a substantially solid body and a generally cylindrical shank depending axially from a bottom of the body; and a bore axially extending from a forward end of the body to a bore termination, the bore including an arcuate portion axially extending from a sidewall of the bore to the bore termination.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Road mining, trenching, and milling equipment utilizes bits and/or picks traditionally set in a bit assembly. Bit assemblies can include a bit and/or pick retained within a bore in a base block. Bit assemblies can also include a bit and/or pick retained by a bit holder and the bit holder retained within a bore in a bit holder block, hereinafter referred to as a base block. A plurality of the bit assemblies are mounted on an outside surface of a rotatable, cylindrical drum, typically in a herringbone, V-shape, or spiral configuration. A plurality of the bit assemblies can also be mounted on an endless chain and plate configuration or on an outer surface of a continuous chain. The combinations of bit assemblies have been utilized to remove material from the terra firma, such as degrading the surface of the earth, minerals, cement, concrete, macadam or asphalt pavement. Individual bits and/or picks, bit holders, and base blocks may wear down or break over time due to the harsh road and trenching degrading environment. In one embodiment, a bit of the present disclosure includes a rounded bottom bit tip insert mounted and brazed in a recess at a forward end of the bit, increasing the surface area of the braze joint while eliminating the fulcrum effect of prior art bit tip inserts when high sideload forces are applied to the bit tip insert. The bit tip insert, in one embodiment, also includes at least three axially aligned ribs on a sidewall of the bit tip insert, providing axial alignment stability, more uniform spacing, and centralization of the insert to its corresponding seat. The bit tip insert of the present disclosure also allows external forces to be directed toward the center of the insert and also allows external forces to be applied and distributed along a more even and uniform fashion not only during manufacture of the bit tip insert but also during use of the bit tip insert and bit, thereby providing a more uniform application of force around the whole perimeter of the insert itself.

Figure 1:
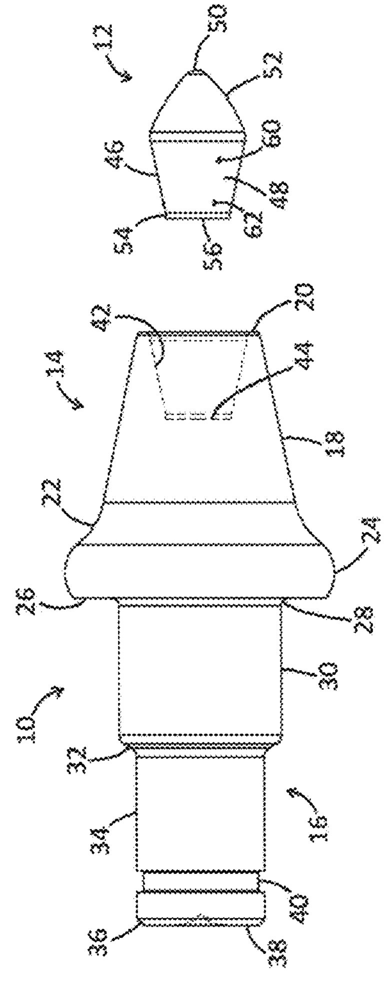
PRIOR ART FIG. 1
FIG. 1 is an exploded side elevation view of a prior art bit and a first embodiment of a prior art bit tip insert, showing invisible internal elements in dotted lines.
Figure 2:
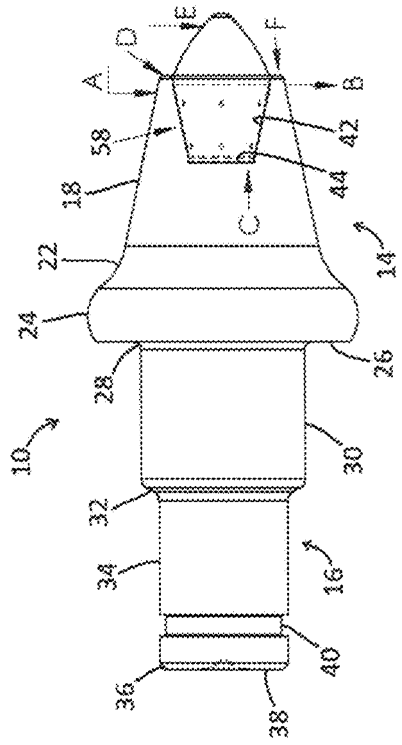
PRIOR ART FIG. 2
FIG. 2 is a side elevation view of the prior art bit and the first embodiment of the prior art bit tip insert, showing invisible internal elements in dotted lines.
Figure 4:
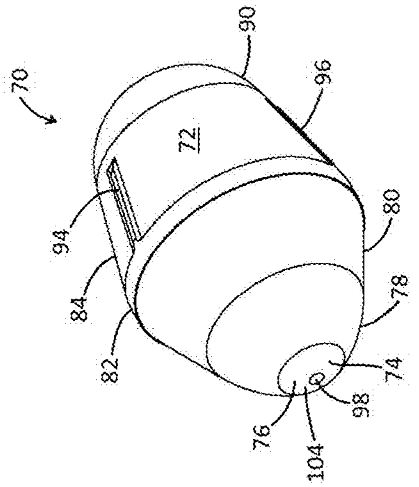
FIG. 4 is a side perspective view of the first embodiment of the bit tip insert in accordance with implementations of this disclosure.

A prior art bit 10 and a prior art bit tip insert 12 are shown in FIGS. 1-2. The prior art bit 10 is substantially solid and comprises a body portion 14 and a shank 16 axially extending from a bottom of the body portion 14. The body portion 14 comprises a tapered upper body portion 18 axially depending from a forward end 20 of the body portion 14. Subjacent the upper body portion 18 is a mediate body portion 22 that generally slopes axially and radially outwardly to a radially extending generally arcuate tire portion 24 that terminates at a generally annular back flange 26 which denotes the bottom of the body portion 14.

The shank 16 comprises a first segment 28 that slopes axially inwardly from the back flange 26 to a generally cylindrical second segment 30. The second segment 30 axially extends from the first segment 28 to a shoulder 32 that slopes axially inwardly from the second segment 30 to a generally cylindrical third segment 34. The third segment 34 axially extends from the shoulder 32 to a tapered distal portion 36 adjacent a distal end 38 of the shank 16. The third segment 34 comprises an annular groove 40 adjacent the tapered distal portion 36 of the shank 16 where it can be engaged by a bit retainer (not shown) or the like.

The upper body portion 18 includes a tapered bore 42 that axially extends from the forward end 20 of the body portion 14 to a bore termination 44 disposed within the upper body portion 18. The bore 42 provides a space for receiving a complementary shaped tapered outer sidewall or body 46 of the prior art bit tip insert 12. The prior art bit tip insert 12 comprises a base 48 and a conical tip 50 at a forward end 52 of the bit tip insert 12. The base 48 comprises the complementary shaped tapered outer sidewall or body 46 and a cylindrical distal portion 54 subjacent the outer sidewall or body 46 that extends to the distal end 56 of the bit tip insert 12. The bit tip insert 12 is adapted to be mounted and brazed in the complementary shaped bore 42 of the body portion 14.

This prior art bit 10 has two design flaws in the attached bit tip insert 12 region of the bit, as shown and described with reference to FIG. 2. The thickness at sector "F" of the bit 10 is generally determined by a thickness value that allows bit penetration into the material being removed. If sector "F" is too wide, penetration of the bit is reduced. The thickness of the frontal portion of the bit 10 at location "F" is too narrow to withstand a high value sideload at location "E". The applied sideload at location "E" causes "B" to push away due to less sidewall support at location "B" and due to the pivot action at location "C" acting as a fulcrum lever. When a small movement occurs at location "B", a fulcrum force at location "C" adds to the force applied at location "E" to cause the braze joint 58 (FIG. 2) to fail. Braze joint failure causes much accelerated failure of the bit itself.

Referring to FIGS. 3-21, a first embodiment of a bit tip insert 70 comprises a base 72 and a tip 74 at a forward end 76 of the bit tip insert 70. The tip profile, which comprises a full tip radius or angular tip profile, is usually made to the same included angle of the attack angle of a bit holder or base block. The tip profile of the forward end 76 of the bit tip insert 70 includes an apex 98 of the tip insert 70, a parabolic or conical section 80 adjacent the parabolic curved section 78, and a generally cylindrical section 82 adjacent the parabolic or conical section 80. In other embodiments, the forward end 76 of the bit tip insert 70 can also have a frustoconical shape, a flat generally cylindrical puck shape, a parabolic ballistic shape, a conical shape, an angular shape, and/or an arcuate shape. An illustrated exemplary implementation of the dimensions of the first embodiment of the bit tip insert 70, shown in FIGS. 14-19, is for illustration purposes only and is not intended to limit this disclosure. Larger and/or smaller size embodiments of the bit tip insert may be utilized within the scope of the invention.

Figure 7:
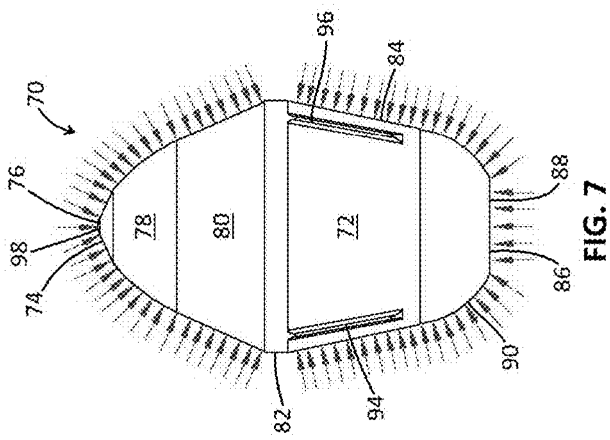
FIG. 7 is a side elevation view of the first embodiment of the bit tip insert in accordance with implementations of this disclosure.
Figure 6:
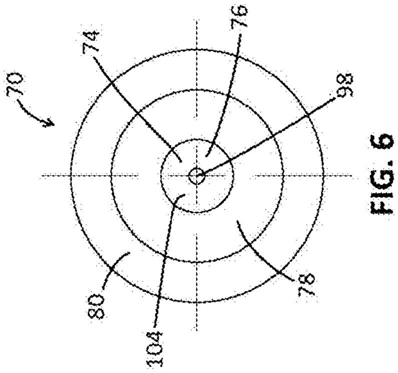
FIG. 6 is a top elevation view of the first embodiment of the bit tip insert in accordance with implementations of this disclosure.
Figure 3:
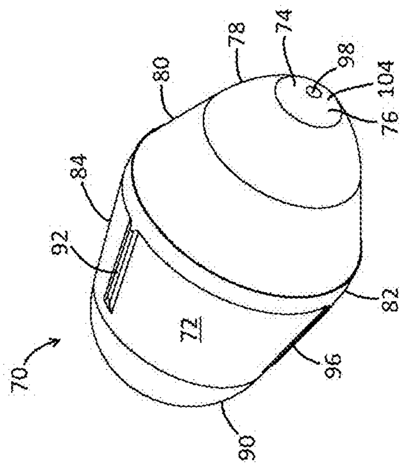
FIG. 3 is a side perspective view of a first embodiment of a bit tip insert in accordance with implementations of this disclosure.
Figure 5:
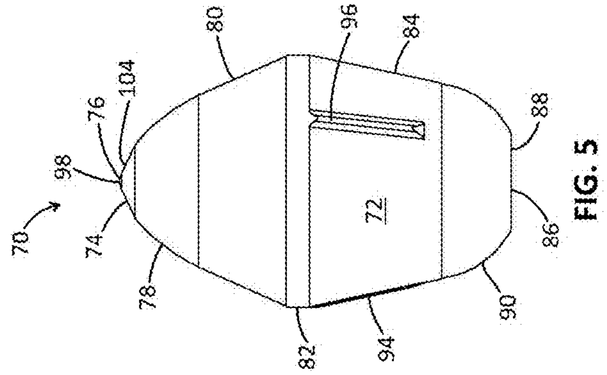
FIG. 5 is a side elevation view of the first embodiment of the bit tip insert in accordance with implementations of this disclosure.
Figure 10:
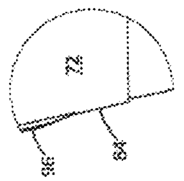
FIG. 10 is a detail view of Detail A of FIG. 9 of the first embodiment of the bit tip insert in accordance with implementations of this disclosure.
Figure 9:
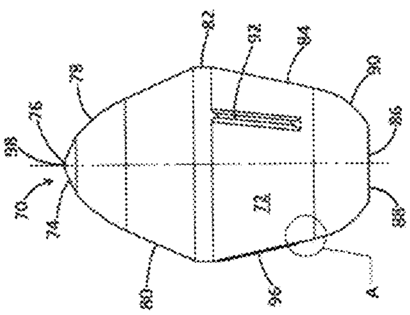
FIG. 9 is a side elevation view of the first embodiment of the bit tip insert in accordance with implementations of this disclosure.
Figure 13:
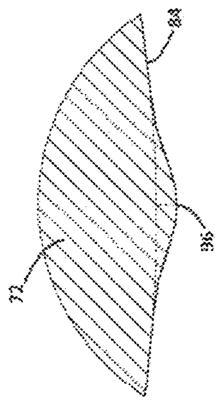
FIG. 13 is a detail view of Detail C of FIG. 12 of the first embodiment of the bit tip insert in accordance with implementations of this disclosure.
Figure 11:
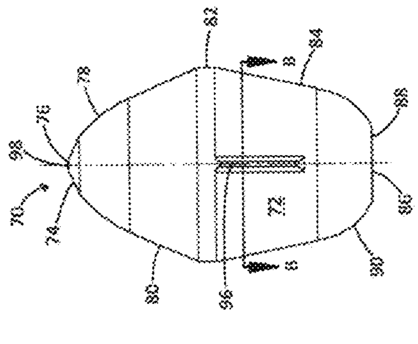
FIG. 11 is a side elevation view of the first embodiment of the bit tip insert in accordance with implementations of this disclosure.
Figure 12:
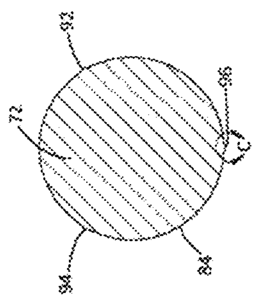
FIG. 12 is a cross-sectional view of the first embodiment of the bit tip insert, taken along line B-B of FIG. 11, in accordance with implementations of this disclosure.
Figure 8:
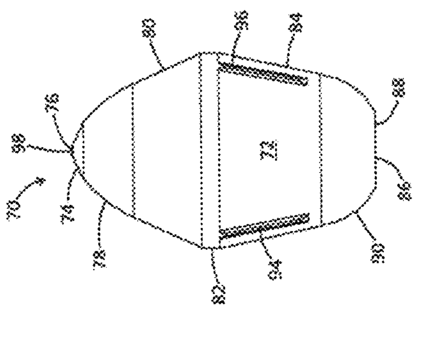
FIG. 8 is a side elevation view of the first embodiment of the bit tip insert in accordance with implementations of this disclosure.
Figure 16:
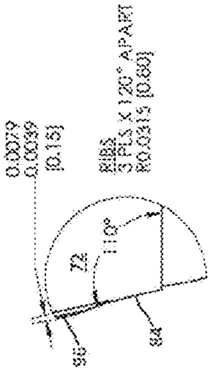
FIG. 16 is a detail view of Detail D of FIG. 15 of the first embodiment of the bit tip insert in accordance with implementations of this disclosure.
Figure 15:
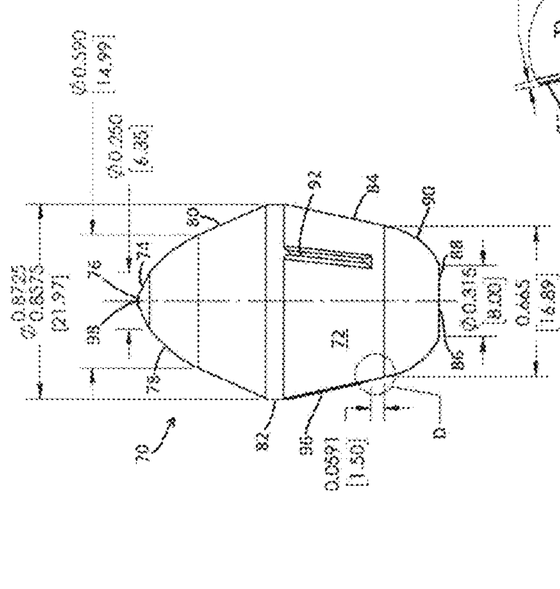
FIG. 15 is a side elevation view of the first embodiment of the bit tip insert in accordance with implementations of this disclosure.
Figure 19:
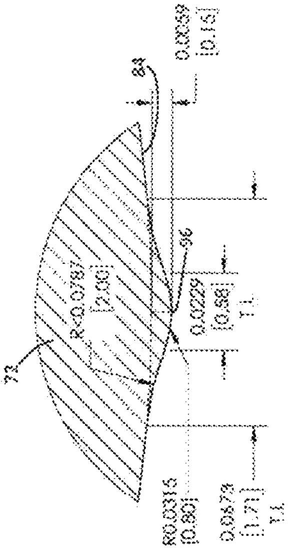
FIG. 19 is a detail view of Detail F of FIG. 18 of the first embodiment of the bit tip insert in accordance with implementations of this disclosure.
Figure 17:
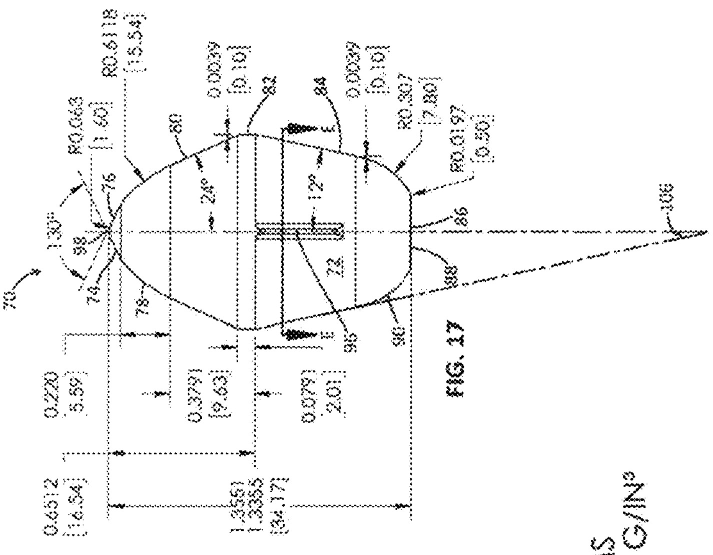
FIG. 17 is a side elevation view of the first embodiment of the bit tip insert in accordance with implementations of this disclosure.
Figure 18:
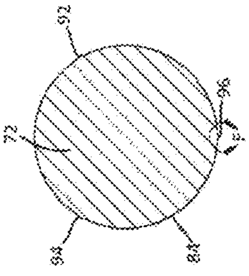
FIG. 18 is a cross-sectional view of the first embodiment of the bit tip insert, taken along line E-E of FIG. 17, in accordance with implementations of this disclosure.
Figure 14:
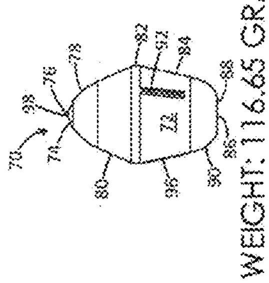
FIG. 14 is a side elevation view of the first embodiment of the bit tip insert in accordance with implementations of this disclosure.
Figure 20:
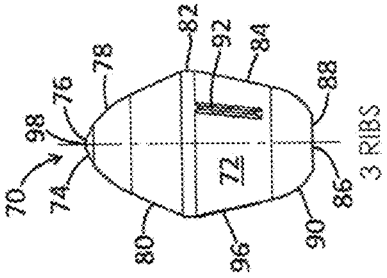
FIG. 20 is a side elevation view of the first embodiment of the bit tip insert in accordance with implementations of this disclosure.
Figure 21:
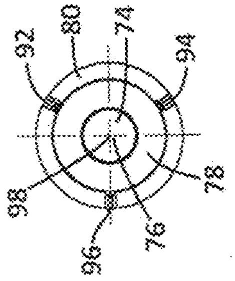
FIG. 21 is a top elevation view of the first embodiment of the bit tip insert in accordance with implementations of this disclosure.

The tip profile of the bit tip insert 70 determines its ability to withstand applied forces. The tip geometry also determines the rate of tip wear. The greater the surface area of the tip portion, the more vertical force, rather than horizontal force, is applied to the tip, as shown in FIG. 7. When two different tip geometries are used in nearly the same highly abrasive, high compressive loading cutting conditions, the more robustly constructed tip geometry will outperform the other tip profile designs for various reasons: (1) a smaller tip profile does not contain a sufficient cross-sectional tip configuration to withstand variable angular impacts for removal of high compressive rock formations; (2) the narrow tip profile, by nature of its design, has a smaller tip radius and/or smaller tip profile which is followed by a transitioning sidewall that enlarges as it axially descends to a maximum diameter of the bit tip insert at about mid-length; (3) the narrow tip profile, due to its design, has poor powder processing issues when the insert is first formed during the powder pressing cycle, the forces, both horizontal and vertical, are more horizontal than vertical and not equally distributed, and the majority of the upper punch forces are applied well below the apex of the bit tip insert tip profile because the tonnage of the press is mostly consumed by the total bit tip insert surface area by the punch that forms the tip profile; and (4) a small tip profile will wear away more rapidly and develop a tip profile that approximates the same angle that the bit and/or tool engages the tierra firma or macadam, unless the holder bore wear and/or base block bore wear causes a different angle to develop.

The base 72 comprises a complementary shaped tapered outer sidewall or body 84 that forms an acute angle 106 (FIG. 17) with a longitudinal axis 108 of the bit tip insert 70. The bit tip insert 70 is adapted to be mounted in a complementary shaped recess 162 at a forward end 138 of a first embodiment of a bit 130 and/or a complementary shaped recess 182 at a forward end 138 of a second embodiment of a bit 180. The base 72 comprises a small central flat bottom 86 at a distal end 88 of the bit tip insert 70, which in this illustrated embodiment has a nominal ¼ inch diameter. An arcuate portion 90 extends arcuately from the acutely-tapered outer sidewall 84 of the base 72 to the small flat bottom 86 at the distal end 88 of the base 72 of the bit tip insert 70, which is complementary shaped to a tapered sidewall 168, 186, an arcuate portion 176, 188, and a recess termination 164, 184 of the recess 162, 182 of the bit 130, 180, respectively. The addition of the radius profile on the bottom side surface (arcuate portion 90) of the bit tip insert 70 increases the surface area of the braze joint 172 while eliminating the fulcrum effect of the flat bottom bit tip insert 12. Additionally, better heat penetration is provided to the base 72 of the bit tip insert 70. In this illustrated embodiment, the radial stress occurring at a location adjacent an apex 98 (FIGS. 3-7) of the tip 74 of the bit tip insert 70 will lessen the radial stress on a sidewall 166 of the forward end 138 of the bit 130 and on the sidewall 166 of the forward end 138 of the bit 180 without premature bit failure.

Referring to FIGS. 3-5, 7-11, 13-17, and 19-21, the tapered outer sidewall 84 of the base 72 comprises at least three axially aligned ribs 92, 94, 96 nearly evenly spaced 120 degrees from each other. The three rib configuration provides radial centralization of the bit tip insert 70 to its corresponding seat in recess 162, 182 of bits 130, 180, respectively, by contacting the tapered sidewall 168, 186 of recess 162, 182 of bit 130, 180, respectively. The selected length of the ribs 92, 94, 96 provides radial alignment repeatability. The rib is insert configuration specific and will vary in width, length, and height depending on the design of the insert. The ribs 92, 94, 96, and any additional ribs, comprise the same approximate height throughout the length of the rib, thereby achieving better braze bonding. The use of the rib profile achieves repeatable braze strength values. The addition of the radius profile, arcuate portion 90, on the bottom side surface of the bit tip insert 70 increases the surface area of the braze joint while eliminating the fulcrum effect of a flat bottom bit tip insert 12 of the prior art and thereby reducing the radial stress on the sidewall 166 at a forward end 138 of the bit 130, 180.

Figure 22:
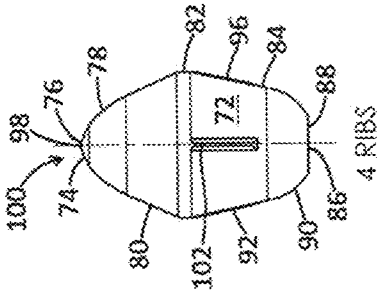
FIG. 22 is a side elevation view of a second embodiment of a bit tip insert in accordance with implementations of this disclosure.
Figure 23:
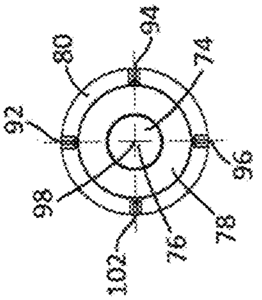
FIG. 23 is a top elevation view of the second embodiment of the bit tip insert in accordance with implementations of this disclosure.
Figure 24:
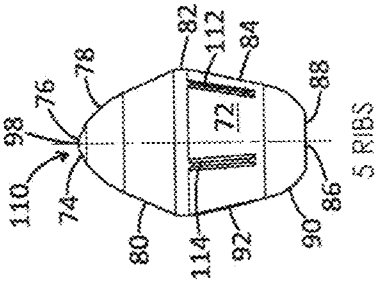
FIG. 24 is a side elevation view of a third embodiment of a bit tip insert in accordance with implementations of this disclosure.
Figure 25:
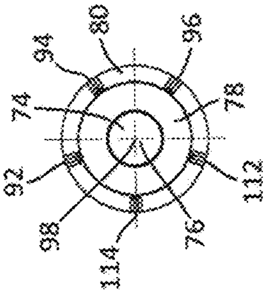
FIG. 25 is a top elevation view of the third embodiment of the bit tip insert in accordance with implementations of this disclosure.
Figure 26:
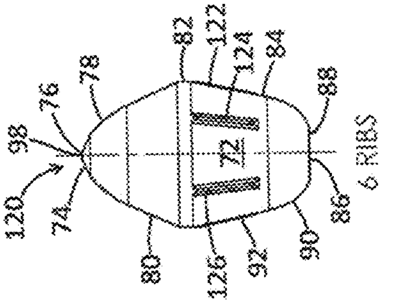
FIG. 26 is a side elevation view of a fourth embodiment of a bit tip insert in accordance with implementations of this disclosure.
Figure 27:
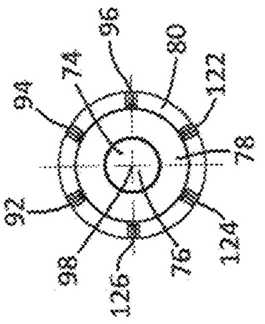
FIG. 27 is a top elevation view of the fourth embodiment of the bit tip insert in accordance with implementations of this disclosure.

In other embodiments, additional ribs may be used and the bit tip insert can include more than three ribs on the outer surface of the base of the bit tip insert. For example, a third embodiment of a bit tip insert 100, shown in FIGS. 22-23, is substantially the same as the first embodiment of the bit tip insert 70 with an exception that the tapered outer surface 84 of the base 72 comprises four axially aligned ribs 92, 94, 96, 102 evenly spaced 90 degrees from each other; a fourth embodiment of a bit tip insert 110, shown in FIGS. 24-25, is substantially the same as the first embodiment of the bit tip insert 70 with an exception that the tapered outer surface 84 of the base 72 comprises five axially aligned ribs 92, 94, 96, 112, 114 evenly spaced 72 degrees from each other; and a fifth embodiment of a bit tip insert 120, shown in FIGS. 26-27, is substantially the same as the first embodiment of the bit tip insert 70 with an exception that the tapered outer surface 84 of the base 72 comprises six axially aligned ribs 92, 94, 96, 122, 124, 126 evenly spaced 60 degrees from each other.

The bit tip insert 70 is formed in a two part manufacturing process comprising a pressing process to form the part and a hot isostatic pressing (HIP) process. During the green state pressing process, either mechanical or hydraulic pressure is applied between 5,000-15,000 pounds per square inch (PSI). The HIP process pressure generally ranges from 500-30,000 PSI. The maximum limit, currently, for HIP pressure is 50,000 PSI. During the green state pressing process, external forces are applied and distributed around the outer perimeter of the insert and evenly directed toward the center of insert 70, as shown in FIG. 7. The outer profile of the insert 70 dictates how axial and radial forces are directed to the insert 70. Each outer segment of the insert 70 is specifically designed to direct the external applied forces when forming the insert 70 in the green state as well as completing the final form of the insert 70 during the HIP process. The ideal shape of the insert should always direct the applied lines of force toward the center of the insert 70 where the greatest mass of the insert 70 is able to absorb the applied external forces. The bit tip insert 70 is approximately 20% larger after the green state pressing process than after the HIP process.

Hot Isostatic Pressing (HIP) is a technology of isotropic compression and compacting of objective material by use of high-temperature and high-pressure gas as a pressure and heat-transmitting medium. During the HIP process, the rib height is more precisely determined and the ribs (1 unit of length per location) develop a more uniform spacing than the smaller individual protrusions of the bit tip insert 12 of the prior art. The negative impression on the die itself means that the protrusions won't get an even height on all of the prior art protrusions. Protrusions lack axial and horizontal stability when axial pressure is applied to the tip of the bit tip insert after the braze material has reached its liquid phase. The rounded bottom profile (arcuate portion 90) adjacent the central flat bottom 86 of the bit tip insert 70 that includes at least three elongate ribs 92, 94, 96 positioned above the rounded base substantially increases the strength of the braze joint. Due to the higher braze joint strength between the bit tip insert 70 and its adjacent seat profile, recess 162, 182 of bit 130, 180, respectively, a thinner profile thickness at "F", annular wall 166, is acceptable to support the cutting forces that would cause a fully flat bottom bit tip insert 12 of the prior art to fail prematurely.

Figure 35:
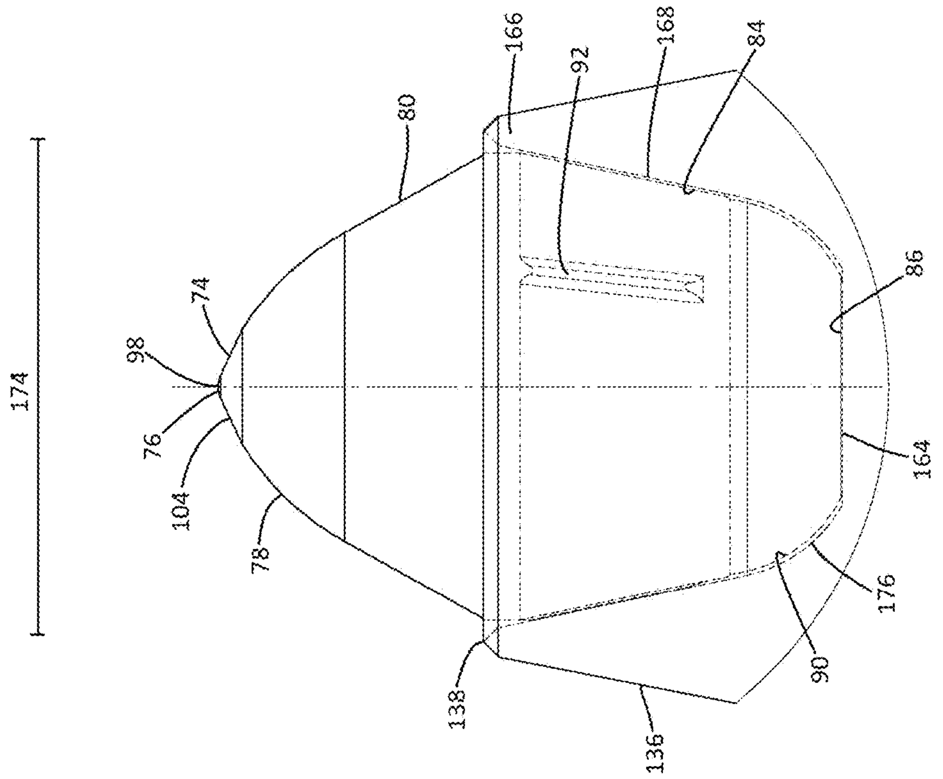
FIG. 35 is a detail view of Detail K of FIG. 34 of the first embodiment of the bit tip insert mounted in the first embodiment of the bit, showing invisible internal elements in dotted lines, in accordance with implementations of this disclosure.
Figure 34:
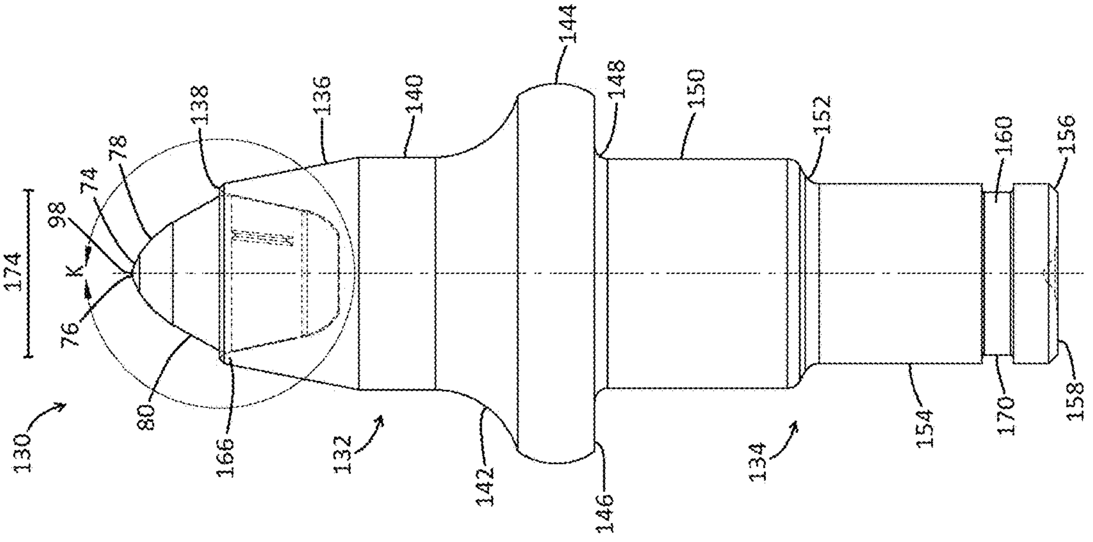
FIG. 34 is a side elevation view of the first embodiment of the bit, shown with the first embodiment of the bit tip insert, showing invisible internal elements in dotted lines, in accordance with implementations of this disclosure.
Figure 36:
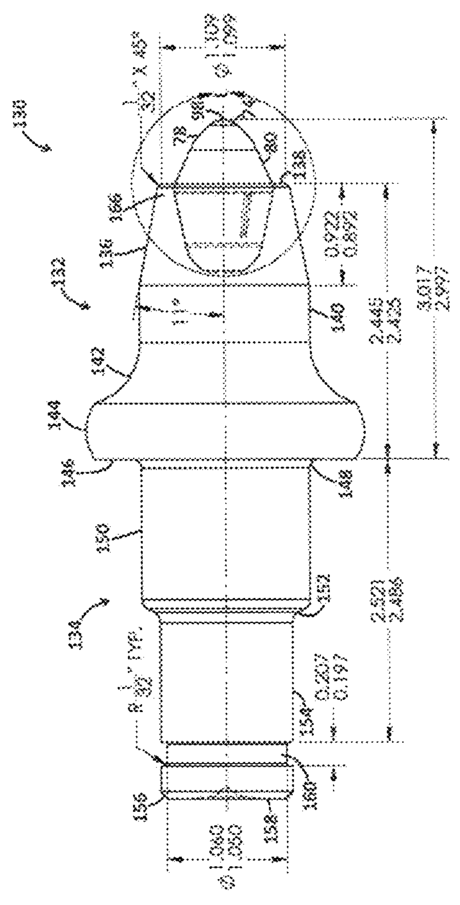
FIG. 36 is a side elevation view of the first embodiment of the bit, shown with the first embodiment of the bit tip insert, showing invisible internal elements in dotted lines, in accordance with implementations of this disclosure.
Figure 37:
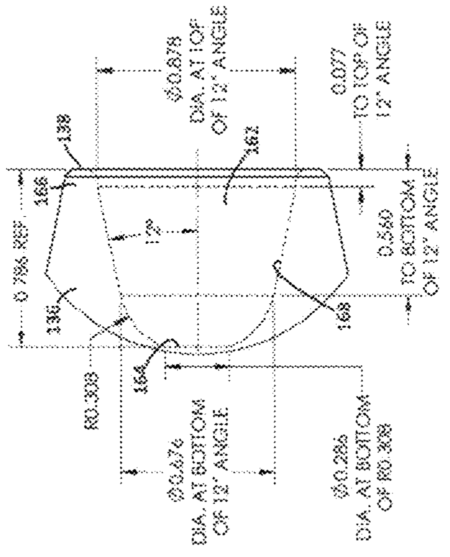
FIG. 37 is a detail view of Detail L of FIG. 36 of the first embodiment of the bit tip insert mounted in the first embodiment of the bit in accordance with implementations of this disclosure.
Figure 38:
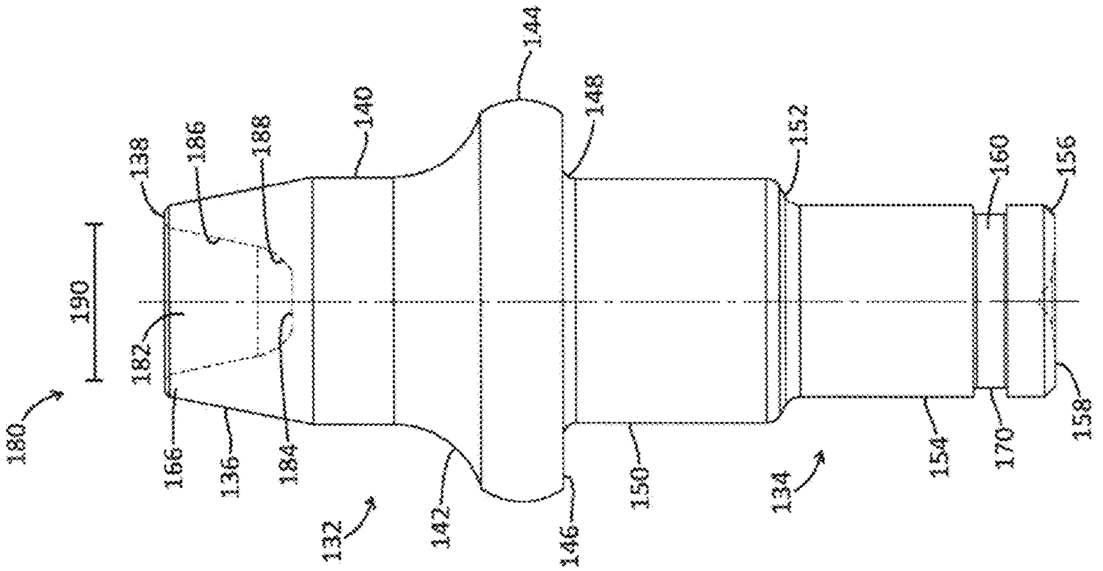
FIG. 38 is a side elevation view of a second embodiment of a bit in accordance with implementations of this disclosure.
Figure 40:
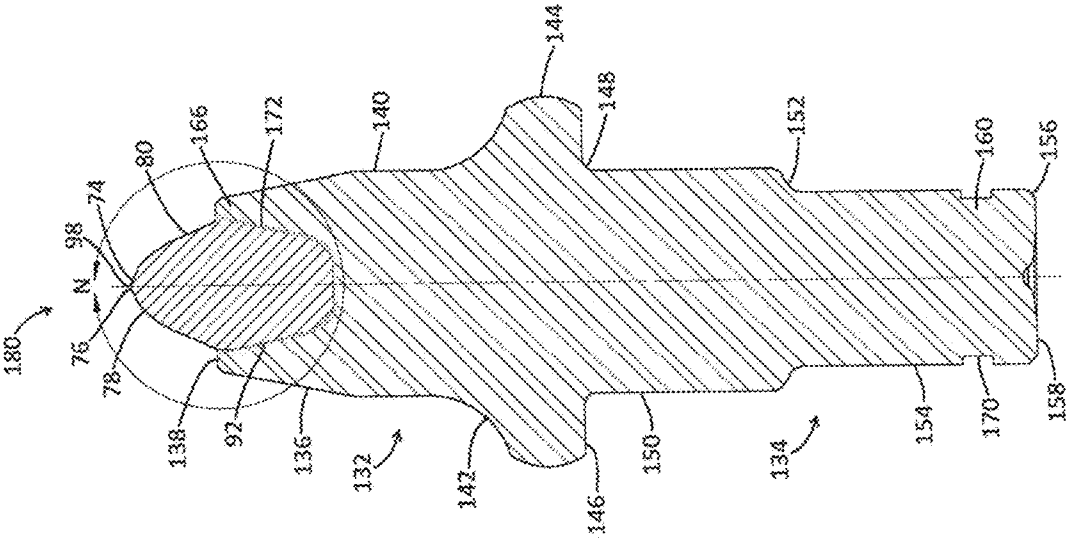
FIG. 40 is a cross-sectional view of the second embodiment of the bit, shown with the first embodiment of the bit tip insert, taken along line M-M of FIG. 39, in accordance with implementations of this disclosure.
Figure 39:
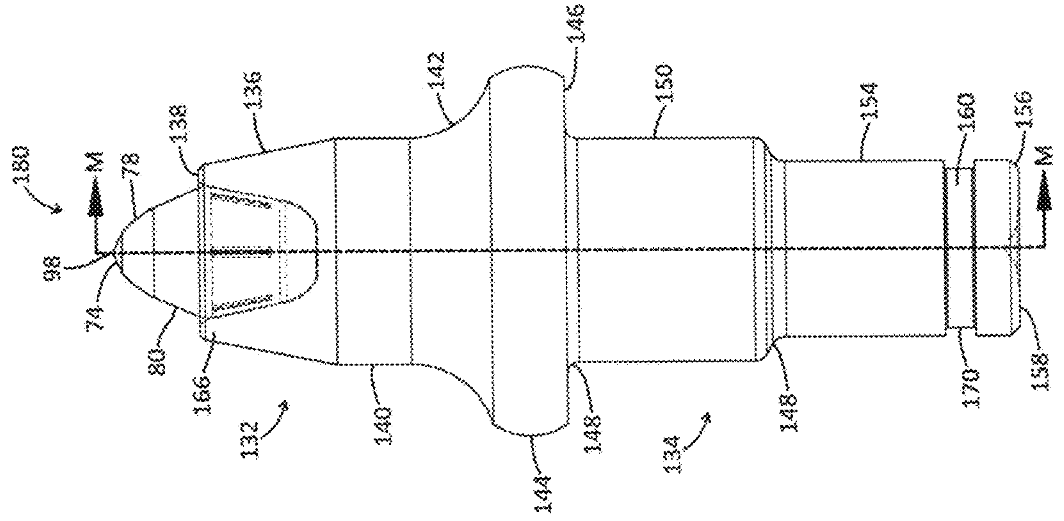
FIG. 39 is a side elevation view of the second embodiment of the bit, shown with the first embodiment of the bit tip insert, showing invisible internal elements in dotted lines, in accordance with implementations of this disclosure.

Referring to FIGS. 28-37, a first embodiment of the rotatable or non-rotatable substantially solid bit or tool 130 comprises a body portion 132, which can be made of steel 15B37, 4140, 4340, or other similar suitable materials, and a shank 134 axially extending from a bottom of the body portion 132. The body portion 132 comprises, in this illustrated embodiment, an outwardly tapered upper body portion 136 axially depending from a forward end 138 of the body portion 132. The upper body portion 136 is outwardly tapered, in this exemplary implementation, as it extends axially from the forward end 138. Subjacent the upper body portion 136 is a generally cylindrical first mediate body portion 140 that axially extends to a second mediate body portion 142. The second mediate body portion 142 generally slopes axially and radially outwardly to a radially extending generally arcuate tire portion 144 that terminates at a generally annular back flange 146 which denotes the bottom of the body portion 132. An illustrated exemplary implementation of the dimensions of the first embodiment of the bit tip insert 70 and the first embodiment of the bit 130, shown in FIGS. 36-37, is for illustration purposes only and is not intended to limit this disclosure. Larger and/or smaller size embodiments of the bit tip insert and/or bit may be utilized within the scope of the invention.

The shank 134 comprises a first segment 148 that slopes axially and radially inwardly from the back flange 146 to a generally cylindrical second segment 150. The second segment 150 axially extends from the first segment 148 to a shoulder 152 that slopes axially and radially inwardly from the second segment 150 to a generally cylindrical third segment 154. The third segment 154 axially extends from the shoulder 152 to a tapered distal portion 156 adjacent a distal end 158 of the shank 134. The third segment 154 comprises an annular groove 160, which in this illustrated embodiment includes a flat inner surface 170, but can also have an arcuate or other shaped surface in other embodiments, adjacent the tapered distal portion 156 of the shank 134 where it can be engaged by a bit retainer (not shown) or the like. The retainer annular groove is retainer style specific and may require different shapes.

Figure 28:
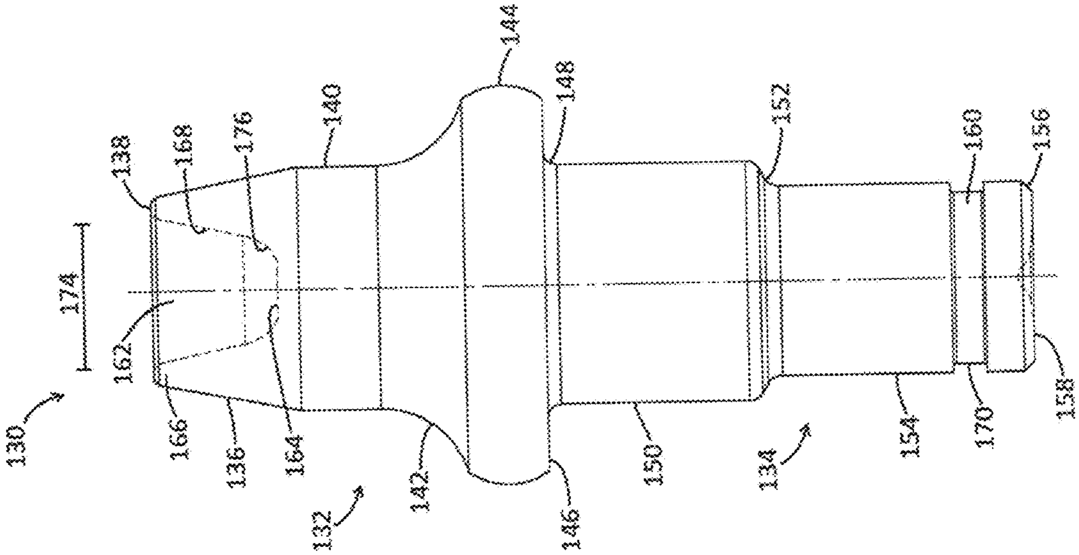
FIG. 28 is a side elevation view of a first embodiment of a bit in accordance with implementations of this disclosure.
Figure 30:
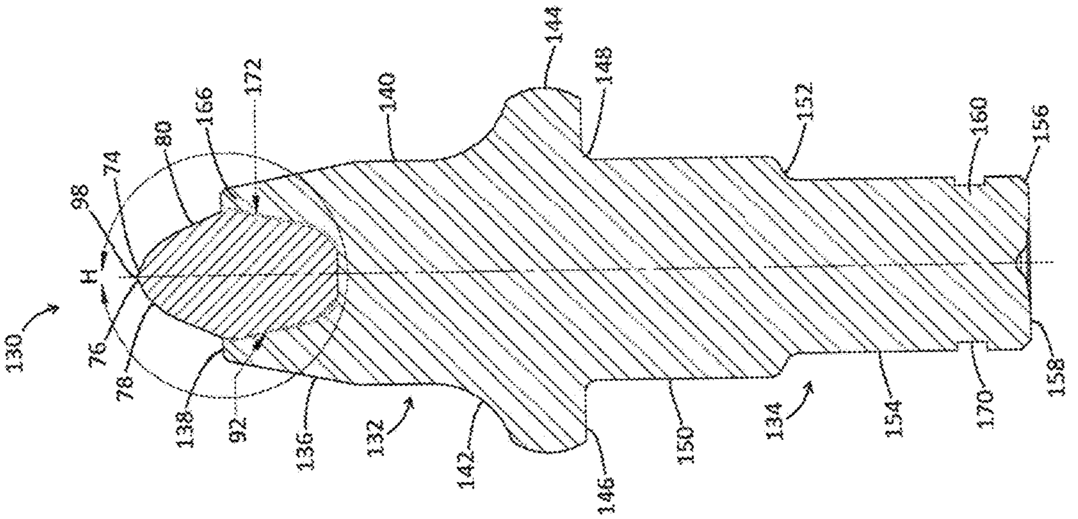
FIG. 30 is a cross-sectional view of the first embodiment of the bit, shown with the first embodiment of the bit tip insert, taken along line G-G of FIG. 29, in accordance with implementations of this disclosure.
Figure 29:
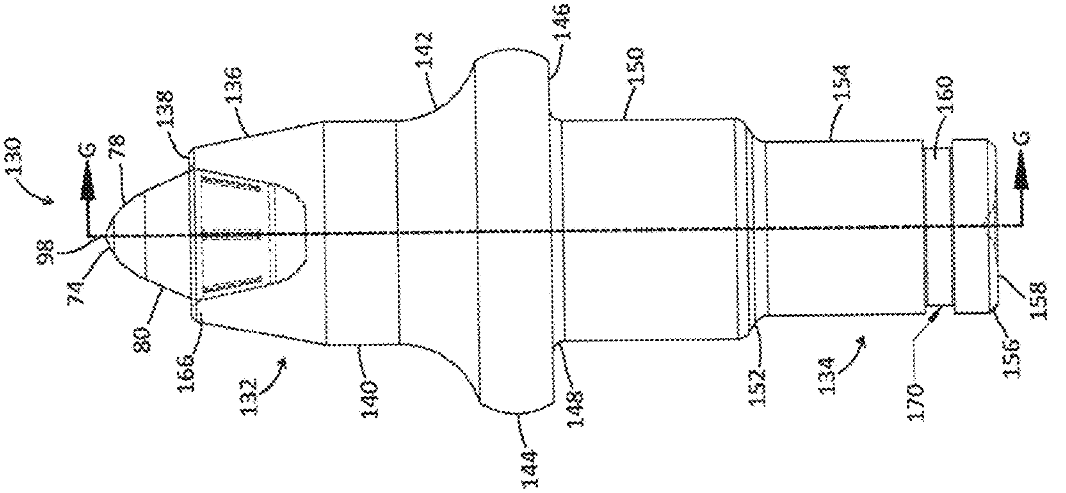
FIG. 29 is a side elevation view of the first embodiment of the bit, shown with the first embodiment of the bit tip insert, showing invisible internal elements in dotted lines, in accordance with implementations of this disclosure.
Figure 32:
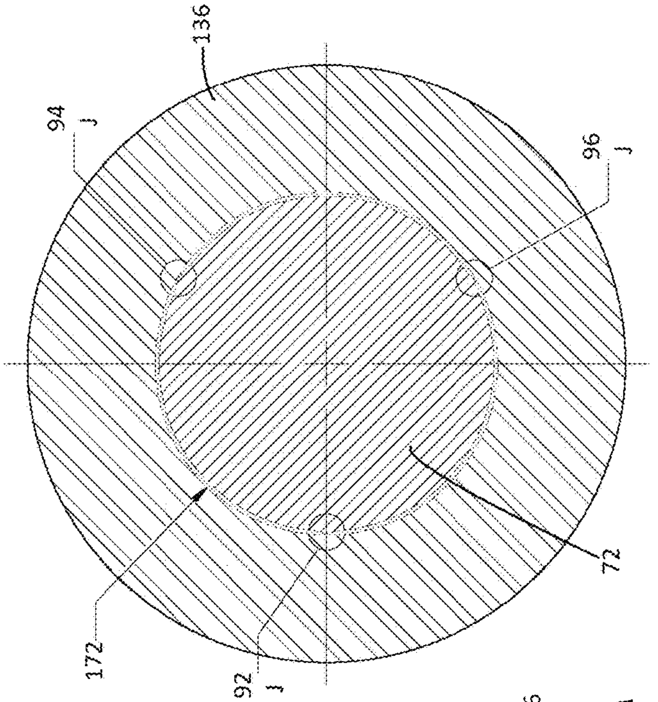
FIG. 32 is a cross-sectional view of the first embodiment of the bit tip insert mounted in the first embodiment of the bit, taken along line I-I of FIG. 31, in accordance with implementations of this disclosure.

The upper body portion 136 of the bit 130 is machined to comprise the recess or cavity 162 extending axially inwardly from the forward end 138 to the recess termination 164 disposed within the upper body portion 136. In this exemplary implementation, the recess 162 comprises a diameter 174, shown in FIGS. 28, 34, and 35, throughout its length that is complementary to the diameter of the base 72 of the bit tip insert 70. The annular sidewall 166 of the bit 130 surrounding the recess 162 comprises a weak region of the upper body portion 136 of this first embodiment, however, the rounded convex bottom profile (arcuate portion 90) adjacent the central flat bottom 86 of the bit tip insert 70 that includes at least three elongate ribs 92, 94, 96 positioned above the rounded convex base substantially increases the strength of the braze joint as described above. In this illustrated embodiment, the recess 162 includes the tapered sidewall 168 that curves into the recess termination 164 which is generally flat, as shown in FIGS. 28, 35, and 37. The arcuate portion 176 extends arcuately from the tapered outer sidewall 168 of the recess 162 to the flat recess termination 164, which is complementary shaped to the tapered sidewall 84, arcuate portion 90, and flat bottom 86 of the bit tip insert 70. The recess 162 provides a space for receiving the complementary shaped tapered outer sidewall or body 84 of the first embodiment of the bit tip insert 70, which in this embodiment is made of tungsten carbide.

The bit tip insert 70 is then brazed in the recess 162 at the forward end 138 of the bit 130. When induction heating a steel member, the magnetic flux lines develop within the coil of the induction heating system. The magnetic flux lines excite the magnetic iron in the steel and create high heat in the steel member which then melts the non-magnetic braze material. The combination of the heated steel and the melted braze material transfers heat sufficiently to the tungsten carbide bit tip insert which then attaches the steel-braze-carbide together. In this exemplary implementation of the first embodiment, preferably the tapered outer sidewall 84 of the base 72 is sufficiently spaced from the tapered sidewall 168 of the recess 162 of the upper body portion 136 to allow braze material 172 to flow between the parts and establish the braze thickness when the bit tip insert 70 is brazed in the recess 162 of the upper body portion 136 of the bit 130, as shown in FIGS. 30-33. The central flat bottom 86 of the bit tip insert 70 acts as a piston to ooze the molten braze material gradually along the lower portion of the bit tip insert 70 and squeeze out air bubbles and particles, cleansing the recess 162 of the bit 130 as braze material moves upward.

Figure 33:
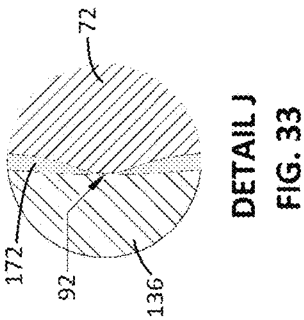
FIG. 33 is a detail view of Detail J of FIG. 32 of the first embodiment of the bit tip insert mounted in the first embodiment of the bit in accordance with implementations of this disclosure.
Figure 31:
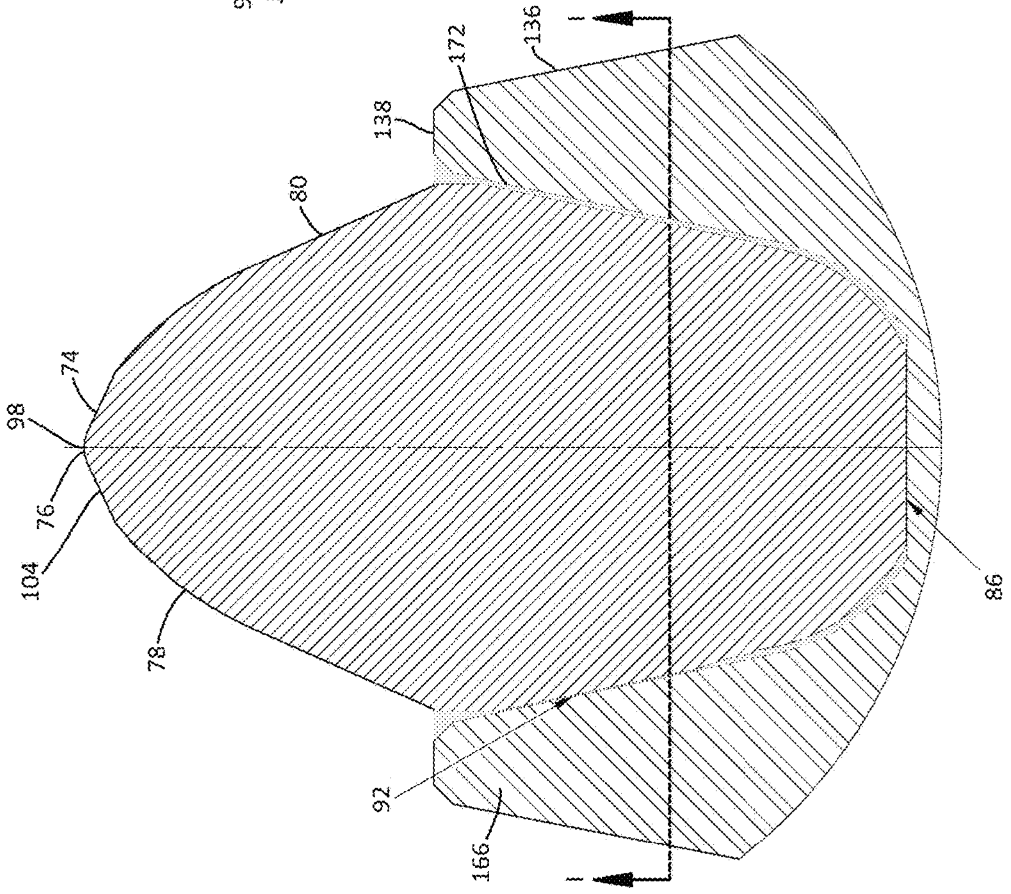
FIG. 31 is a detail view of Detail H of FIG. 30 of the first embodiment of the bit tip insert mounted in the first embodiment of the bit in accordance with implementations of this disclosure.

The bit tip insert 70 must be pressed when the braze material is molten to ooze out all the excess braze material and until the concave sides of the ribs 92, 94, 96 are fully seated in the recess 162 of the bit 130 and in contact with tapered sidewall 168 of the recess 162, as shown in FIG. 33. The radiused feature of the arcuate portion 90 of the bit tip insert 70 increases the length of contact surface between the bit tip insert 70 and the recess 162 of the bit 130 and allows for a closer relationship of the bit tip insert 70 to its mating surface, recess 162 of the bit 130. The radius profile of the arcuate portion 90 of the bit tip insert 70 and the arcuate portion 176 of the bit 130 allows capillary action and allows melted flux material to flow freely from the base region of the bit tip insert 70 and the bottom of the recess 162 of the upper body portion 136 until the flat bottom 86 of the bit tip insert 70 contacts the flat bottom of the recess termination 164 such that there is no space between the bottom of the bit tip insert 70 and the bottom and/or recess termination 164 of the recess 162, as shown in FIG. 31. This design provides a lower attachment strength but still produces a strong braze joint and reduces the radial stress on the sidewall 166 of the forward end 138 of the bit 130.

Figure 45:
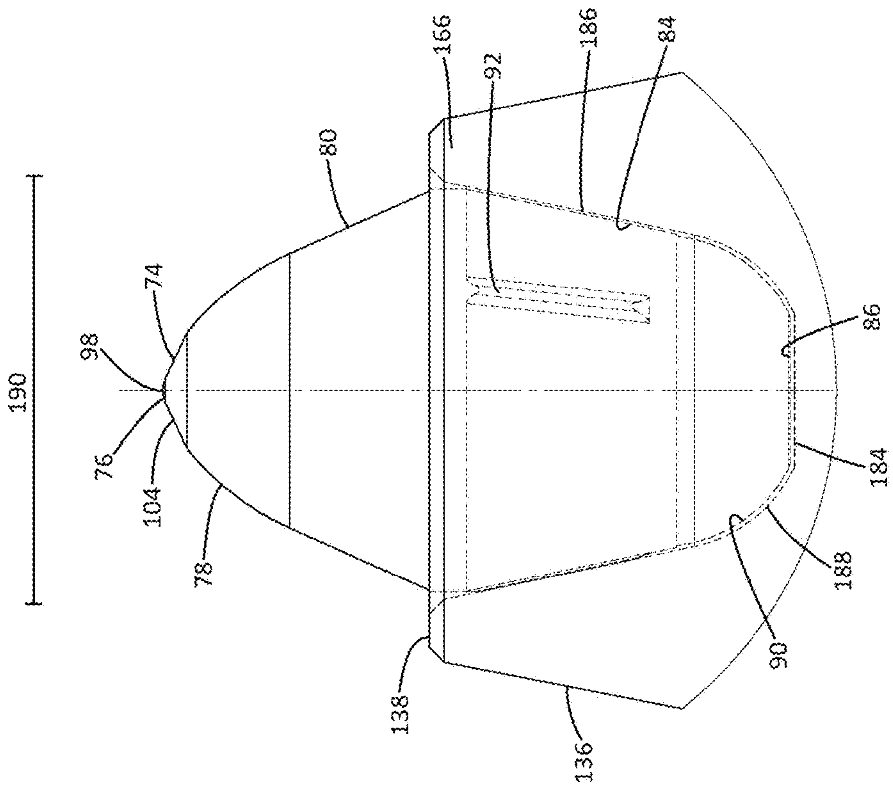
FIG. 45 is a detail view of Detail Q of FIG. 44 of the first embodiment of the bit tip insert mounted in the second embodiment of the bit, showing invisible internal elements in dotted lines, in accordance with implementations of this disclosure
Figure 44:
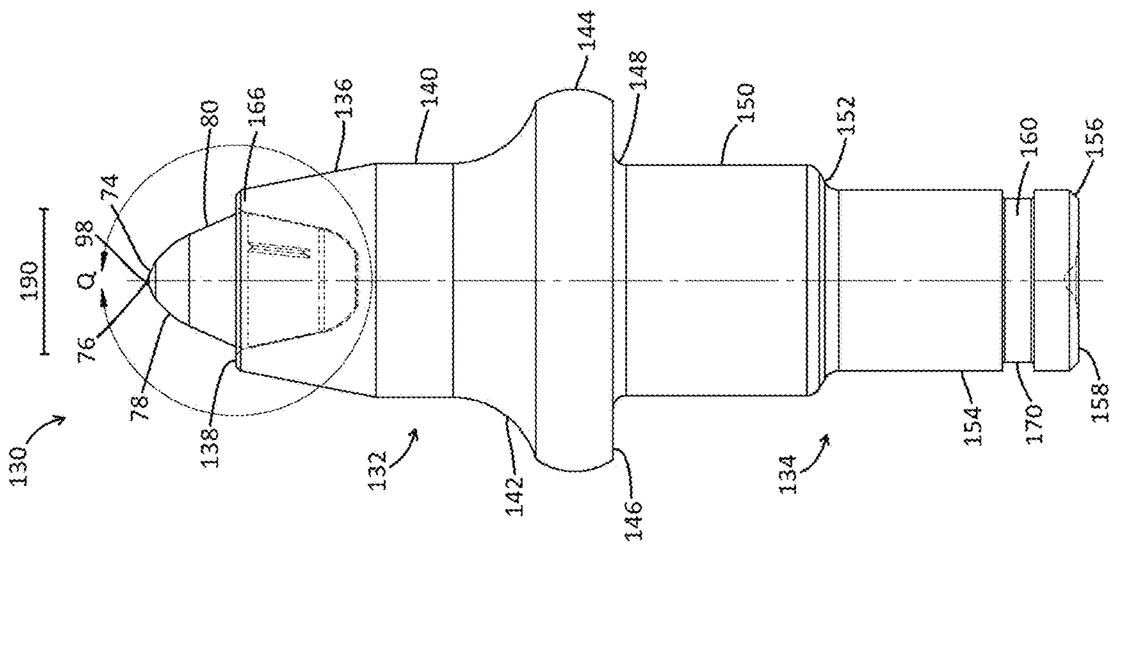
FIG. 44 is a side elevation view of the second embodiment of the bit, shown with the first embodiment of the bit tip insert, showing invisible internal elements in dotted lines, in accordance with implementations of this disclosure.

Referring to FIGS. 36-41, a second embodiment of the rotatable or non-rotatable substantially solid bit or tool 180 is substantially the same as the bit 130 of the first embodiment with an exception that the upper body portion 136 of the bit 180 is machined to comprise the recess 182 that is slightly smaller than recess 162 of bit 130. In this exemplary implementation, the tapered sidewall 186 profile dimension of recess 182 of bit 180 is decreased on a diameter by about 0.005 to 0.035 inch. In this exemplary implementation, the recess 182 comprises a diameter 190, shown in FIGS. 38, 44, and 45, throughout its length that is smaller than the diameter of the base 72 of the bit tip insert 70. The smaller diameter tapered sidewall 186 profile dimension of recess 182 lifts the bit tip insert 70 axially, preventing the flat bottom 86 of the bit tip insert 70 from contacting the arcuate portion 188 and a flat bottom of the recess termination 184 of the recess 182 and allowing the space between the flat bottom 86 of the bit tip insert 70 and the recess termination 182 of the recess 180 to be spaced as needed, such that the flat bottom 86 of the bit tip insert 70 is raised 0.001 to 0.010 inch, in this exemplary implementation, to provide sufficient braze attachment at that location.

The bit tip insert 70 is then brazed in the recess 182 at the forward end 138 of the bit 180. When induction heating a steel member, the magnetic flux lines develop within the coil of the induction heating system. The magnetic flux lines excite the magnetic iron in the steel and create high heat in the steel member which then melts the non-magnetic braze material. The combination of the heated steel and the melted braze material transfers heat sufficiently to the tungsten carbide bit tip insert which then attaches the steel-braze-carbide together. In this exemplary implementation of the second embodiment, preferably the tapered outer sidewall 84 of the base 72 is sufficiently spaced from the tapered sidewall 186 of the recess 182 of the upper body portion 136 to allow braze material 172 to flow between the parts, including the flat bottom 86 of the bit tip insert 70 and the recess termination 184 of the bit 180, and establish the braze thickness when the bit tip insert 70 is brazed in the recess 182 of the upper body portion 136 of the bit 180, as shown in FIGS. 40-43. The central flat bottom 86 of the bit tip insert 70 acts as a piston to ooze out the molten braze material gradually along the lower portion of the bit tip insert 70 and squeezes out air bubbles and particles and cleanses the recess 182 of the bit 180 as braze material moves upward.

Figure 41:
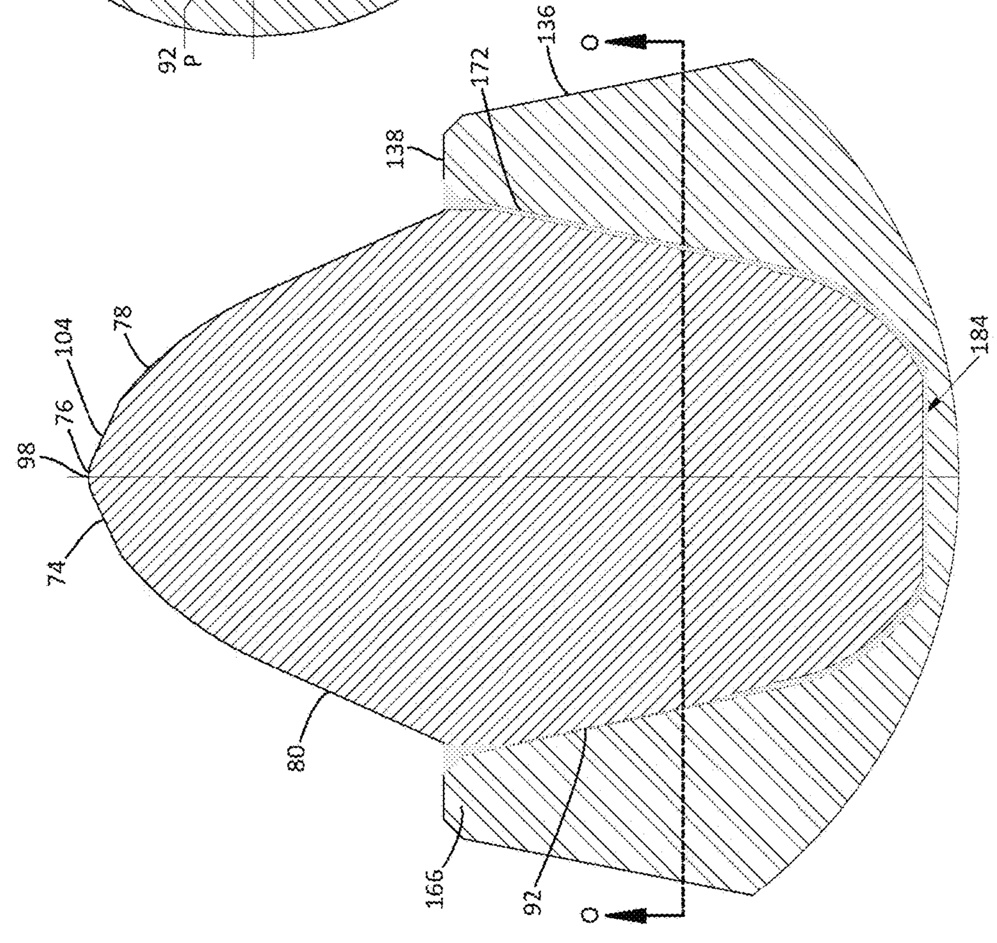
FIG. 41 is a detail view of Detail N of the first embodiment of the bit tip insert mounted in the second embodiment of the bit in accordance with implementations of this disclosure.
Figure 42:
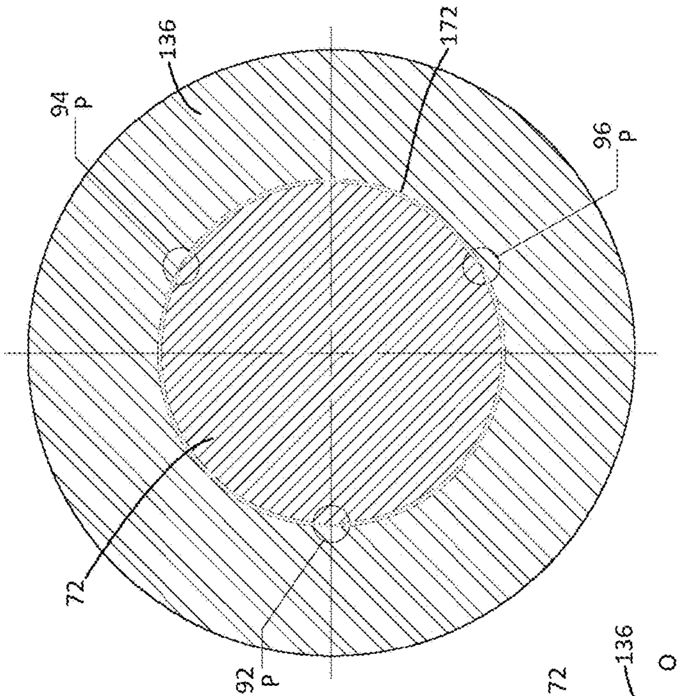
FIG. 42 is a cross-sectional view of the first embodiment of the bit tip insert mounted in the second embodiment of the bit, taken along line O-O of FIG. 41, in accordance with implementations of this disclosure.
Figure 43:
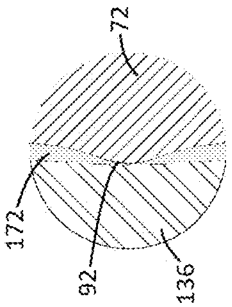
FIG. 43 is a detail view of Detail P of FIG. 42 of the first embodiment of the bit tip insert mounted in the second embodiment of the bit in accordance with implementations of this disclosure.

The bit tip insert 70 must be pressed when the braze material is molten to ooze out all the excess braze material until the ribs 92, 94, 96 are fully seated in the recess 182 of the bit 180. The radiused feature of the arcuate portion 90 of the bit tip insert 70 increases the length of contact surface between the bit tip insert 70 and the recess 182 of the bit 180 and allows for a closer relationship of the bit tip insert 70 to its mating surface, recess 182 of the bit 180. The radius profile of the arcuate portion 90 of the bit tip insert 70 and the arcuate portion 188 of the bit 180 allows capillary action and allows melted flux material to flow freely from the base region of the bit tip insert 70 and the bottom of the recess 182 of the upper body portion 136 until the flat bottom 86 of the bit tip insert 70 is spaced a predetermined distance from the flat bottom of the recess termination 184 such that there is a predetermined space with braze material in between the central flat bottom 86 of the bit tip insert and the recess termination 184 of the bit 180, the flat bottom 86 of the bit tip insert 70 and the recess termination 184 of the bit 180 to be spaced as needed, between the bottom of the bit tip insert 70 and the bottom and/or recess termination 184 of the recess 182, as shown in FIG. 41. This design is achieved by making the bore profile of recess 182 of the bit 180 slightly smaller than the bore profile of recess 162 of the bit 130, which lifts the bit tip insert 70 axially and provides optimal space which achieves the highest braze strength, thereby producing a stronger braze joint and reducing the radial stress on the sidewall 166 of the forward end 138 of the bit 180. This manufacturing method allows the space between the bottom 86 of the bit tip insert 70 and the recess termination 184 of the bit 180 to be spaced as needed.

The braze joint 172, shown in the first embodiment of the bit 130 in FIGS. 30-33 and in the second embodiment of the bit 180 in FIGS. 40-43, strength improves significantly when 4340 steel is used in place of 15B37 steel to join a tungsten carbide insert into the pocket or hole 162, 182 of the upper body portion 136 of the bit 130, 180, respectively. The addition of a nickel alloy, and to a lesser extent the addition of molybdenum and chromium, to the 4340 steel of the bit 160 increases the braze joint strength by nearly a 50% increase of strength value.

In one exemplary implementation, for example, the 4340 steel of the bit 130, 180 comprises 1.55-2.00% nickel alloy along with a small amount of molybdenum and chromium alloys. The 1.55-2.00% nickel alloy in the 4340 steel improves the attachment to the 6% nickel alloy in the low cost HT-548 braze material alloy.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments, it is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A bit tip insert comprising:

a base comprising an outer elongate acutely-tapered sidewall and a rounded annular axially radiused distal outer surface adjacent the outer elongate acutely-tapered sidewall, the outer elongate acutely-tapered sidewall comprising a plurality of evenly spaced elongate axially-oriented radially and outwardly extending ribs thereon, the outer elongate acutely-tapered sidewall forming an acute angle with a longitudinal axis of the bit tip insert;

a tip adjacent a forward end of the base, the tip comprising an apex at a forward end of the tip and one of a radiused tip profile and an angular tip profile subjacent the forward end of the tip, the tip profile comprising a parabolic first outer surface adjacent the apex of the tip and one of a parabolic second outer surface and a conical second outer surface adjacent the parabolic first outer surface; and the rounded annular axially radiused distal outer surface disposed between a distal end of said outer elongate acutely-tapered sidewall and a central planar bottom surface at a distal end of the base, said rounded annular axially radiused distal outer surface enclosing said base from the distal end of the outer elongate acutely-tapered sidewall to the central planar bottom surface, and said rounded annular axially radiused distal outer surface comprising convex surface boundaries continuously formed with a surface next thereto, except for concave surfaces defining outlines of each of said ribs.

2. The bit tip insert of claim 1, further comprising:

an overlay on an outer surface of the tip, the overlay including at least one of polycrystalline diamond, industrial diamond, natural diamond, polycrystalline diamond composite material, and polycrystalline diamond compact material.

3. The bit tip insert of claim 1, the rounded annular axially radiused distal outer surface comprising an arcuate portion axially and radially extending from an outer ending of the outer elongate acutely-tapered sidewall of the base to a central planar bottom outer surface at a distal end of the base.

4. The bit tip insert of claim 1, further comprising:

a generally cylindrical outer surface adjacent one of the parabolic second outer surface and the conical second outer surface.

5. The bit tip insert of claim 1, the plurality of elongate axially oriented radially and outwardly extending ribs comprising at least three elongate axially oriented radially and outwardly extending ribs.

6. The bit tip insert of claim 1, a length of each rib extending a majority of an axial length of said outer elongate acutely-tapered sidewall from which said rib extends.

7. The bit tip insert of claim 1, an outwardly extending height of each rib being the same throughout a length of the rib.

8. A bit comprising:

a substantially solid body and a generally cylindrical shank depending axially from a bottom of the body;

a bore axially extending from a forward end of the body axially inward to a bore termination, the bore comprising a hollow tapered sidewall and an arcuate portion axially extending from a bottom of said sidewall of the bore to the bore termination; and a bit tip insert comprising:

a base comprising an outer elongate acutely-tapered sidewall and a rounded annular axially radiused distal outer surface adjacent the outer elongate acutely-tapered sidewall, the outer elongate acutely-tapered sidewall comprising a plurality of evenly spaced elongate axially-oriented radially and outwardly extending ribs thereon, the outer elongate acutely-tapered sidewall forming an acute angle with a longitudinal axis of the bit tip insert, the base of the bit tip insert adapted to be mounted and brazed within the complementarily shaped bore of the bit;

a tip adjacent a forward end of the base, the tip comprising an apex adjacent a forward end of the tip and one of a radiused tip profile and an angular tip profile, the tip profile comprising a parabolic first outer surface adjacent the apex of the tip and one of a parabolic second outer surface and a conical second outer surface adjacent the parabolic first outer surface; and the rounded annular axially radiused distal outer surface disposed between a distal end of said outer elongate acutely-tapered sidewall and a central planar bottom surface at a distal end of the base, said rounded annular axially radiused distal outer surface enclosing said base from the distal end of the outer elongate acutely-tapered sidewall to the central planar bottom surface, and said rounded annular axially radiused distal outer surface comprising convex surface boundaries continuously formed with a surface next thereto, except for concave surfaces defining outlines of each of said ribs.

9. The bit of claim 8, the bore termination comprising a planar surface.

10. The bit of claim 9, the planar surface of the bore termination of the bit being spaced a predetermined axial distance from a central planar bottom outer surface of the base at a distal end of the base of the bit tip insert when the bit tip insert is mounted and brazed in the bore of the bit.

11. The bit of claim 9, the planar surface of the bore termination of the bit in direct surface contact with a central planar bottom outer surface of the base at a distal end of the base of the bit tip insert when the bit tip insert is mounted and brazed in the bore of the bit.

12. The bit of claim 8, further comprising:

an overlay on an outer surface of the tip, the overlay including at least one of polycrystalline diamond, industrial diamond, natural diamond, polycrystalline diamond composite material, and polycrystalline diamond compact material.

13. The bit of claim 8, the rounded annular axially radiused distal outer surface of the bit tip insert comprising an arcuate portion axially extending from the outer elongate acutely-tapered sidewall of the base to a central planar bottom at a distal end of the base.

14. The bit of claim 8, the bore comprising a bore diameter throughout a length of the bore that is smaller than a base diameter of the base of the bit tip insert, said bore including a planar surface defining said bore termination.

15. The bit of claim 8, further comprising:

a generally cylindrical outer surface adjacent one of the parabolic second outer surface and the conical second outer surface.

16. The bit of claim 8, the bore comprising a diameter throughout an axial length of the bore that is smaller than a diameter of the bit tip insert throughout an axial length of the base of the bit tip insert.

17. The bit of claim 8, the bore comprising a diameter throughout an axial length of the bore that is complementary to a diameter of the bit tip insert throughout an axial length of the base of the bit tip insert.

18. The bit of claim 11, wherein there is no space between the planar surface of the bore termination of the bit and the planar annular bottom outer surface of the base of the bit tip insert when the bit tip insert is mounted and brazed in the bore of the bit.

19. The bit of claim 8, the plurality of elongate axially oriented radially and outwardly extending ribs comprising at least three elongate axially oriented radially and outwardly extending ribs.

20. The bit of claim 8, a length of each rib extending a majority of an axial length of said outer elongate acutely-tapered outer sidewall from which said rib extends.

21. The bit of claim 8, an outwardly extending height of each rib being the same throughout a length of the rib.

22. A high temperature high pressure formed tungsten carbide bit tip insert with a continuous solid rounded surface thereover, comprising:

a lower base portion comprising a tapered portion including an axially acutely-tapered outer sidewall, a rounded annular axially radiused portion adjacent the axially acutely-tapered outer sidewall, and a first central planar bottom surface at a distal end of the lower base portion adjacent the rounded annular axially radiused portion, the axially acutely-tapered outer sidewall comprising a plurality of elongate axially oriented radially and outwardly extending ribs in evenly arcuately spaced orientation around said axially acutely-tapered outer sidewall of said tapered portion, the axially acutely-tapered outer sidewall forming an acute angle with a longitudinal axis of the bit tip insert;

a generally cylindrical middle section extending axially upwardly from said lower base portion;

a forward tip portion extending axially upwardly from said generally cylindrical middle section, the forward tip portion comprising an apex at a forward end of the forward tip portion and one of a radiused tip profile and an angular tip profile adjacent the forward end of the forward tip portion, the forward tip portion comprising a parabolic first outer surface adjacent the apex and one of a parabolic second outer surface and a conical second outer surface adjacent the parabolic first outer surface; and the rounded annular axially radiused portion disposed between a bottom of said axially acutely-tapered outer sidewall and said first central planar bottom surface, said rounded annular axially radiused portion enclosing said lower base portion from the bottom of the axially acutely-tapered outer sidewall to the first central planar bottom surface, and said rounded annular axially radiused portion comprising convex surface boundaries continuously formed with a surface next thereto, except for concave surfaces defining outlines of each of said ribs.

23. The high temperature high pressure formed tungsten carbide bit tip insert of claim 22, said plurality of elongate axially oriented radially and outwardly extending ribs comprising at least three elongate axially oriented radially and outwardly extending ribs.

24. The high temperature high pressure formed tungsten carbide bit tip insert of claim 22, an outwardly extending height of each rib being the same throughout a length of the rib.

25. The high temperature high pressure formed tungsten carbide bit tip insert of claim 22, a length of each said rib extending a majority of an axial length of said acutely-tapered outer sidewall from which said rib extends.

26. The high temperature high pressure formed tungsten carbide bit tip insert of claim 22, further comprising:

an overlay on at least one of an outer surface of said forward tip portion and an outer surface of said generally cylindrical middle section, the overlay including at least one of a polycrystalline diamond, industrial diamond, natural diamond, polycrystalline diamond composite material, and polycrystalline diamond compact material.

27. A high temperature high pressure formed tungsten carbide bit tip insert, with a continuous solid rounded surface thereover, comprising:

a lower base portion comprising a first central planar bottom surface at a distal end of the lower base portion;

a generally cylindrical middle section extending axially upwardly from said lower base portion, said lower base portion defining a tapered portion including an axially acutely-tapered outer sidewall extending from said generally cylindrical middle section, the acutely-tapered outer sidewall forming an acute angle with a longitudinal axis of the bit tip insert;

a forward tip portion extending axially upwardly from said generally cylindrical middle section;

a plurality of elongate axially oriented radially and outwardly extending ribs in evenly arcuately spaced orientation around said acutely-tapered outer sidewall of said tapered portion; and a rounded annular axially radiused portion between a bottom of said acutely-tapered outer sidewall and said first central planar bottom surface, said rounded annular axially radiused portion enclosing said lower base portion from the bottom of the acutely-tapered outer sidewall to the first central planar bottom surface, and said rounded annular axially radiused portion comprising convex surface boundaries continuously formed with a surface next thereto, except for concave surfaces defining outlines of each of said ribs.

28. A tungsten carbide bit comprising:

a substantially solid body and a generally cylindrical shank depending axially from a bottom of the body, the substantially solid body comprising a steel body;

a bore axially extending from a forward end of the substantially solid body axially inward to a bore termination, the bore comprising a hollow tapered sidewall and an arcuate portion axially extending from a bottom of said sidewall of the bore to the bore termination; and a bit tip insert comprising:

a base comprising a radiused distal surface adjacent a distal end of the base and an outer elongate acutely-tapered sidewall, the outer elongate acutely-tapered sidewall comprising a plurality of evenly spaced elongate axially-oriented ribs thereon and a plurality of concave surfaces defining outlines of each of said ribs, the outer elongate acutely-tapered sidewall forming an acute angle with a longitudinal axis of the bit tip insert, the base of the bit tip insert adapted to be mounted and brazed within the bore of the substantially solid body, the bore being complementary shaped with the base of the bit tip insert; and a tip adjacent a forward end of the base, the tip comprising an apex adjacent a forward end of the tip and one of a radiused tip profile and an angular tip profile, the tip profile comprising a parabolic first outer surface adjacent the forward end of the tip, and one of a parabolic second outer surface and a conical second outer surface adjacent the parabolic first outer surface, each outer surface of the bit tip insert comprising a convex surface.

* * * * *